US012591905B2

(12) United States Patent
Lindered

(10) Patent No.: US 12,591,905 B2
(45) Date of Patent: *Mar. 31, 2026

(54) SYSTEMS, METHODS AND COMPUTER PROGRAM PRODUCTS FOR PROVIDING AND VERIFYING PURCHASE OFFERS

(71) Applicant: H & M HENNES & MAURITZ AB, Stockholm (SE)

(72) Inventor: Patrik Lindered, Stallarholmen (SE)

(73) Assignee: H & M HENNES & MAURITZ AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/928,596

(22) PCT Filed: May 28, 2021

(86) PCT No.: PCT/EP2021/064351
§ 371 (c)(1),
(2) Date: Nov. 29, 2022

(87) PCT Pub. No.: WO2021/239948
PCT Pub. Date: Dec. 2, 2021

(65) Prior Publication Data
US 2023/0214871 A1 Jul. 6, 2023

(30) Foreign Application Priority Data
May 29, 2020 (SE) .................................. 2050619-2

(51) Int. Cl.
*G06Q 30/00* (2023.01)
*G06Q 20/32* (2012.01)
(Continued)

(52) U.S. Cl.
CPC ..... *G06Q 30/0223* (2013.01); *G06Q 20/3274* (2013.01); *G06Q 20/4014* (2013.01); *G06Q 30/0633* (2013.01)

(58) Field of Classification Search
CPC ........... G06Q 30/0223; G06Q 20/3274; G06Q 20/4014; G06Q 30/0633; G06Q 30/0224;
(Continued)

(56) References Cited

U.S. PATENT DOCUMENTS

2011/0145051 A1* 6/2011 Paradise ............ G06Q 30/0601
705/26.7
2012/0084137 A1* 4/2012 Shimogori ............. G06Q 30/02
705/14.39
(Continued)

FOREIGN PATENT DOCUMENTS

WO 2012135115 A2 10/2012

OTHER PUBLICATIONS

"Modularization of mobile shopping assistance systems". IEEE. 2013. (Year: 2013).*
(Continued)

*Primary Examiner* — Maria V Vanderhorst
(74) *Attorney, Agent, or Firm* — Davis Wright Tremaine LLP

(57) ABSTRACT

The present invention relates to systems, methods and computer program products for providing in-store purchase offers. A control system is configured to receive event data from a mobile device and provide purchase offers based on obtained event data. An optically readable code for verifying that the customer is authorized to take advantage of a purchase offer is displayed on the customer's mobile device in response to an identified event. The consumer is provided with a purchase offer including at least a second product different from the first product associated with an image acquired by the mobile device.

20 Claims, 5 Drawing Sheets

(51) Int. Cl.
*G06Q 20/40* (2012.01)
*G06Q 30/0207* (2023.01)
*G06Q 30/0601* (2023.01)
*G05B 19/418* (2006.01)

(58) Field of Classification Search
CPC .......... G06Q 30/0238; G06Q 30/0261; G06Q 30/0281; G06Q 30/0631; G06Q 30/06; G06Q 20/20; G06Q 20/3276; G06Q 30/0267

See application file for complete search history.

(56) References Cited

U.S. PATENT DOCUMENTS

| | | | |
|---|---|---|---|
| 2012/0158482 A1* | 6/2012 | Paradise ............ | G06Q 30/0623 705/26.61 |
| 2012/0245985 A1* | 9/2012 | Cho ....................... | G06Q 20/16 705/14.23 |
| 2015/0039439 A1 | 2/2015 | Das et al. | |
| 2015/0220963 A1* | 8/2015 | Priebatsch ......... | G06Q 30/0238 705/14.38 |

OTHER PUBLICATIONS

International Search Report and Written Opinion issued in related PCT Application No. PCT/EP2021/064351, on Aug. 9, 2021 in 13 pages.
European Patent Office, "Examination Report" in Application No. 21 730 165.4-1218, Mar. 4, 2025, 11 pages.

\* cited by examiner

STEP 301: SCAN PHYSICAL PRODUCT BARCODE

STEP 302: TRANSMIT BARCODE DATA

STEP 303: TRANSMIT PURCHASE OFFER DATA

STEP 304: DISPLAY PURCHASE OFFER

STEP 305: IDENTIFY ACCEPTANCE EVENT DATA

STEP 306: TRANSMIT ACCEPTANCE EVENT DATA

STEP 401: RECEIVE SCANNED BARCODE DATA

STEP 402: DETERMINE PRODUCT FROM BARCODE

STEP 403: IDENTIFY PURCHASE OFFER

STEP 404: TRANSMIT PURCHASE OFFER DATA

STEP 405: RECEIVE ACCEPTANCE EVENT DATA

STEP 406: TRANSMIT OPTICALLY READABLE CODE

SYSTEMS, METHODS AND COMPUTER PROGRAM PRODUCTS FOR PROVIDING AND VERIFYING PURCHASE OFFERS

CROSS-REFERENCE TO RELATED APPLICATIONS

The present disclosure is a 371 U.S. National Phase of International Patent Application No. PCT/EP2021/064351, filed May 28, 2021, entitled "SYSTEMS, METHODS AND COMPUTER PROGRAM PRODUCTS FOR PROVIDING AND VERIFYING PURCHASE OFFERS," which claims priority to Swedish Patent Application No. 2050619-2, filed May 29, 2020, the contents of which are incorporated herein by reference in their entirety.

TECHNICAL FIELD

In various embodiments, the present invention is generally directed to systems, methods and computer program products for providing in-store product information and purchase offers. An exemplary control system, or backend system, is configured to receive, from a consumer's mobile device, event data indicating the consumer's interest in purchasing products available at a store and then subsequently provide purchase offers based on previously obtained event data, and an optically readable code used for validating or verifying the purchase offer in the store. In embodiments, an optically readable code is displayed on the customer's mobile device in response to an event identified by an application program running on the customer's mobile device, where the contents of the optically readable code provided to a customer is adapted to be used for validating or verifying that the customer is authorized to take advantage of the purchase offer. In embodiments, the present invention relates to the acquisition of an image identifying a first product and, in response to the acquired image, by obtaining event data representing the event of acquiring the image and/or a subsequent event identified by the application program, the consumer is provided with a purchase offer including at least a second product different from the first product identified by the acquired image.

BACKGROUND

Advances in mobile technology have enhanced in-store shopping activities by allowing consumers to purchase items in real-time. For example, consumers now have access to the application programs (APPs) on mobile devices such as cell phones, smart phones and personal data assistants that facilitate the identification and purchase of items without physical presentation of the item to a point-of-sale terminal. So-called "scan and buy" APPs eliminate the frustrating experience of waiting in a check-out line and can increase sales by eliminating when consumers remove items from their shopping cart prior to checkout.

Mobile devices such as mobile phones permit retailers to connect with their customers and barcodes, such as QR codes, supply the interactive means to accomplish this. These barcodes can easily direct a retail establishment's customers to their Twitter, Facebook, Instagram and other social networking accounts. For example, a QR code could take customers to a mobile ecommerce site or a product demo. Barcodes such as QR codes may be indispensable when a retailer has online campaigns, advertisements, or TV commercials. QR codes can also be used to encourage customers to purchase products by relaying valuable information and alerting them to upcoming sales, unique promotions, and offering them an interactive view of new products on the way. Retailers can also utilize QR codes to capture important customer information. For example, retailers can include a simple sign-up feature on the QR destination page to encourage visitors to enter their email address for special deals.

Customer Relationship Management (CRM) systems, client databases and methods use various information technologies to learn a customer's preferences, offer products and special deals to the customer according to those preferences, and to foster or reward customer loyalty. In order to maintain a high level of customer loyalty, it is desirable for a retailer to enhance a customer's in-store experience by anticipating her preferences and offering customized services.

Merchants, especially those that derive their revenue from online sales, are keenly interested in spending significant marketing dollars analyzing data generated by these events to increase their conversion rates. Once in a physical store, however, such analysis techniques typically disappear. Consumers can pick up, view, analyze and even open a product, place it in their basket for a while, and the merchant has no information about the event. Such events may provide even more insights into the shopping habits and product preferences of a consumer than online activities.

Problems with the Prior Art

Consumers are beginning to rely on web-based solutions as an alternative to traditional in-store shopping. As a result, electronic commerce has expanded the focus of large retailers by offering on-line purchasing as a method for providing a broader assortment of products and pricing options to consumers. Typically, this occurs outside of the retail establishment which in turn eliminates in-store merchandising and promotion opportunities.

Retailers are constantly exploring ways to communicate with their shoppers utilizing mobile technologies. Many applications focus on promotion messaging that encourages consumers to shop in their stores. Many mobile applications for shoppers are offered by third party service providers. While the service may vary, they are typically offer based and utilize location services with the aid of zip codes and global positioning systems (GPS). These applications target interest such as store locators, weekly circulars, digital coupons or offers, generic item pricing, and the like.

Current technology offers consumer search options and the ability to find items, locate where they are offered and at what price. However, these pricing applications offer retailers little benefit unless they are a low-price leader in the market. Therefore, there is a need for systems and methods adapted to enhance the costumer's shopping experience by providing product information and purchase offers in realtime to the consumer while in-store and where the offers are adapted to be personalized and relevant for the customer in being based on the consumer's shown interest in a product and previous shopping behavior, and such that the consumer may easily purchase products in-store.

Moreover, customers are individuals who usually have personal preferences for purchasing different products. The individuals often visit known similar stores to purchase their preferred products. Merchants desire to capture an insight into a future propensity of an event in relation to the individual and construct purchase offers accordingly. Based on this insight, the merchants can drive personalized recommendations and provide purchase offers to individuals in real-time while the customer is in the store to thereby improve their sales revenue. Conventionally, these personalized recommendations and offers may not be relevant, as the recommendations may characterize offers from merchants located in places distant from the individual. Thus, the relevance of these personalized recommendations and offers can be further improved by using knowledge about the historical shopping behaviour of the individual as well as knowledge about previously recorded purchases by other customers of products the individual shows an interest or previously recorded purchases of products associated with the product the individual shows an interest.

SUMMARY

What is needed is a system and methods for providing a customer with in-store purchase offers reflecting the customer's shown interest and shopping behaviour and presented to the customer while the customer is present in a store where the at least one product of the purchase offer are available.

What is further needed is a system and methods for validly and securely validating or verifying, in real-time and to a staff member at the store and/or the cashier system or computer system of the store, that a customer, or user of a mobile device, can take advantage of a purchase offer, e.g. a customized or personalized purchase offer, provided to the customer while in the store.

The system, methods and computer program products of the technology disclosed is adapted to provide a customer with purchase offers in response to event data indicating the customer's interest in a product while the customer is present in a store in which products of the purchase offer are available.

In embodiments, the technology disclosed relates to a system, methods and computer program products for capturing and acting in response to a sequence of events or subsequently received event data, e.g. automatically and in real-time, in order to display data representing a purchase offer on the screen of the customer's mobile device.

In embodiments, data for generating and/or displaying the purchase offer, or representing the purchase offer, is provided by the control system to a predetermined group of mobile devices including the mobile device in response to the control system receiving a barcode or image data following the scanning of a barcode, or acquiring of an image, associated with the physical product item in the store where the barcode or image is adapted for identifying, by the control system, a first product or product category to which the physical product item belongs.

In embodiments, the purchase offer may then be determined, retrieved and/or created/constructed by the control system in response to identifying the first product or first product category and data for generating and/or displaying the purchase offer on the displays of the predetermined group of mobile devices may be transmitted in response to determining, retrieving and/or creating/constructing the purchase offer. The purchase offer may then have been previously created/constructed at least partly based on event data received, by the control system, from a plurality of mobile devices among the predetermined group of mobile devices including the mobile device.

In embodiments, the purchase offer is constructed prior to at least one of said step of receiving image or barcode or data representing said image or barcode associated with a physical first product item being offered for sale by the store and receiving event data associated with the first product or first product category. The purchase offer may then be at least partly based on at least one of the historical shopping behavior of the user of the mobile device and event data received from other mobile devices.

In embodiments, the purchase offer is constructed by the control system in response to at least one of the events of receiving said image or barcode or data representing said image or barcode associated with a physical first product item being offered for sale by the retail store and receiving event data associated with said first product or first product category. The purchase offer may then also be at least partly based on at least one of obtained event data reflecting the historical shopping behavior of the user of said mobile device and event data received from other mobile devices.

In embodiments, the control system may then be configured to dynamically create/construct or change purchase offers based on the event data that the control system receives from mobile devices and/or contents that the control system receives or retrieves from social media platforms such as Twitter, Facebook and Instagram. In certain embodiments, the purchase offers may be dynamically created/constructed and changed by the control system based on event data received from the plurality of mobile devices within a group of mobile devices, e.g. a predetermined group of mobile devices, and the plurality of mobile devices in the group of mobile devices are provided with the purchase offer in response to the control system receiving, from at least one of the mobile devices of the group, a scanned barcode or acquired image for identifying a first product or first product category.

In embodiments, the technology disclosed relates to a system, methods and computer program products for capturing and acting in response to a sequence of events or subsequently received event data, e.g. automatically and in real-time, in order to display data for validating or verifying a purchase offer on the screen of the customer's mobile device.

In embodiments, the technology disclosed relates to a system, methods and computer program products for capturing and acting in response to a sequence of events or subsequently received event data, e.g. automatically and in real-time, in order to display an optically readable code for validating or verifying on the screen of the customer's mobile device that the customer is authorized to take advantage of a purchase offer provided to the customer while in the store.

In aspects, the user of a mobile device who shows up at the cahier's desk with physical product items corresponding to the at least one product item of a purchase offer provided to the user's mobile device is subsequently, and in response to further event data received from the same mobile device, provided with an optically readable code adapted for securely validating or verifying to a staff member of the store and/or a cashier system or a computer system of the store, that the user of the mobile device is authorized to take advantage of the purchase offer, e.g. a customized or personalized purchase offer.

In embodiments, the control system provides the optically readable to a plurality of mobile devices within a group of mobile devices, e.g. a predetermined group of mobile devices, where the plurality of mobile devices in the group of mobile devices are provided with the optically readable code, or data for generating and/or displaying the optically readable code, in response to the control system receiving, from at least one of the mobile devices of the group, event data indicating the acceptance, by the user of the mobile device, of a purchase offer previously provided by the control system to the mobile device in response to receiving, from the mobile device, a scanned barcode or an image adapted for identifying, by the control system, a first product associated with the purchase offer.

In aspects, the technology disclosed relates to a method of receiving, by a control system or backend system, event data from a mobile device and, in response to receiving the event data. transmitting, from the control system, an optically readable code or data adapted for displaying an optically readable code to be presented on the display of the mobile device, where the optically readable code, when scanned, read or recognized, is adapted to validate or verify that the user of the mobile device is authorized to take advantage of a purchase offer. The purchase offer may then have been provided to the mobile device through the transmission of data representing the purchase offer from the control system and in response to the acquiring or scanning of an image or barcode associated with a physical product item in the store where the verification by the acquiring or scanning is performed. The event data transmitted from the mobile device to the control system may then have been transmitted by the mobile device in response to identifying, by the mobile device, at least one event indicating the acceptance, by the user of the mobile device, of the purchase offer provided to the mobile device.

In aspects, the technology disclosed relates to a control system, or backend system, configured to receive event data from a mobile device and, in response to receiving the event data. transmit an optically readable code or data adapted for displaying an optically readable code to be presented on the display of the mobile device, where the optically readable code, when scanned, read or recognized, is adapted to validate or verify that the user of the mobile device is authorized to take advantage of a purchase offer. The purchase offer may then have been provided to the mobile device through the transmission of data representing the purchase offer from the control system and in response to the acquiring or scanning of an image or barcode associated with a physical product item in the store where the verification by the acquiring or scanning is performed. The event data transmitted from the mobile device to the control system may then have been transmitted by the mobile device in response to identifying, by the mobile device, at least one event indicating the acceptance, by the user of the mobile device, of the purchase offer provided to the mobile device.

In embodiments, the technology disclosed relates to method for providing a user of a mobile device with a purchase offer including at least one product available to customers in a store and while the user is present in the store, said method comprising the steps of:
- a. transmitting, from the mobile device to the control system, event data representing the at least one event indicating the acceptance of said purchase offer;
- b. receiving, by the control system, said event data representing said at least one event indicating the acceptance of said purchase offer; and
- c. transmitting, from the control system to the mobile device, data adapted to be used for generating and/or displaying an optically readable code representing said purchase offer or reflecting the items currently in the shopping basket which includes the product items of said purchase offer, wherein said transmission of said data is performed in response to and triggered by said control system receiving said event data.

In embodiments, the technology disclosed relates to method for providing a user of a mobile device with a purchase offer including at least one product available to customers in a store and while the user is present in the store, said method comprising:
- a. acquiring or scanning, by an image acquisition component or scanner operatively connected to the mobile device, an image or barcode associated with a physical product item being offered for sale by the store, wherein said physical product item belongs to a first product or first product category;
- b. transmitting, by said mobile device, said image or barcode, or data representing said image or barcode, to a control system which is comprising, or is at least one of operatively coupled to and communicatively connected to, a database;
- c. transmitting, from the control system to the mobile device, data representing a purchase offer;
- d. displaying, in a browser or an application program running on the mobile device and on the screen of said mobile device, data representing said purchase offer, wherein said step of displaying is performed in response to said mobile device receiving said data representing said purchase offer; and
- e. identifying, by the application program running on the mobile device, the at least one event indicating the acceptance, by the user of the mobile device, of said purchase offer
- f. transmitting, from the mobile device to the control system, event data representing the at least one event indicating the acceptance of said purchase offer;
- g. receiving, by the control system, said event data representing said at least one event indicating the acceptance of said purchase offer; and
- h. transmitting, from the control system to the mobile device, data adapted to be used for generating and/or displaying an optically readable code representing said purchase offer or reflecting the items currently in the shopping basket which includes the product items of said purchase offer, wherein said transmission of said data is performed in response to and triggered by said control system receiving said event data; and
- i. receiving, by the mobile device, data adapted to be used for generating and/or displaying an optically readable code representing said purchase offer; and
- j. displaying, by the mobile device, the optically readable code representing said purchase offer, wherein said optically readable code is adapted to validate or verify, when scanned, read or shown to a staff member in the store, that the user is authorized to take advantage of said purchase offer.

In embodiments, the technology disclosed relates to method for providing a user of a mobile device with a purchase offer including at least one product available to customers in a store and while the user is present in the store, said method comprising:
- a. acquiring or scanning, by an image acquisition component or scanner operatively connected to the mobile device, an image or barcode associated with a physical product item being offered for sale by the store, wherein said physical product item belongs to a first product or first product category;
- b. transmitting, by said mobile device, said image or barcode, or data representing said image or barcode, to a control system which is comprising, or is at least one of operatively coupled to and communicatively connected to, a database;
- c. transmitting, from the control system to the mobile device, data representing a purchase offer;

d. displaying, in a browser or an application program running on the mobile device and on the screen of said mobile device, data representing said purchase offer, wherein said step of displaying is performed in response to said mobile device receiving said data representing said purchase offer; and e. identifying, by the application program running on the mobile device, the at least one event indicating the acceptance, by the user of the mobile device, of said purchase offer; and f. displaying, by the mobile device, an optically readable code representing said purchase offer or reflecting the items currently in the shopping basket which includes the product items of said purchase offer, wherein said display of said optically readable code is displayed in response to and/or triggered by said identifying of the at least one event indicating the acceptance of said purchase offer, wherein said optically readable code is adapted to validate or verify, when scanned, read or shown to a staff member in the store, that the user is authorized to take advantage of said purchase offer.

In certain aspects, the technology disclosed is directed to facilitating the provision of purchase offers in real-time, and more particularly to methods and a system for offering an enhanced shopping experience in a store based on event data reflecting the shopping behaviour of the customer receiving the purchase offer as well as event data received from other customers, i.e. other customer's mobile devices, and which indicates the shopping behaviour of these other customers.

In other aspects, the technology disclosed is directed to the task of validating or verifying that a customer is authorized to take advantage of a purchase offer, and more particularly to method and a system for capturing and acting on event data to provide secure verification of the customer's authorization to take advantage of the purchase offer.

In embodiments, the displayed data representing the purchase offer may then include the purchase of both a first product which physical product item associated barcode was scanned or read in the store by the mobile device receiving the purchase offer and the purchase of an product item of at least one second product which associated barcode the mobile device was not scanned or read before receiving the purchase offer. After first receiving and then accepting the purchase offer, the customer typically needs to fetch at least one physical item of the second product and bring the at least one physical item of the first product and the at least one physical item of the second product to the cash register desk or and/or a self-checkout terminal, where the image data representing the purchase offer is shown or scanned/read by a device to validate or verify that the user of the mobile device is authorized to take advantage of the purchase offer.

In embodiments, the provided purchase offer, including at least one item of the first product, which associated barcode was scanned before receiving the purchase, and at least one item of a second product different from the first product, where the combined purchase offer is at least partly based on previously received event data, i.e. received before the customer entered the store. The combined offer, including both the first product which physical product item's associated barcode label was scanned or read by the mobile device and the second product may then be created/constructed at least partly based on identified and/or received events and/or event data obtained before the customer entered the store, where the events and/or event data was identified by and/or received from at least one of the customer's own mobile device and the mobile devices of other customers. The previously identified and/or received events and/or event data may then be associated with previously performed purchases of items of the first product and of the second product, e.g. combined or aggregated purchases including at least one item of the first product and at least one item of the second product.

In aspects, the system, methods adapted for validly and computer program products of the technology disclosed are adapted for securely validating or verifying, to the staff member at the store and/or the cashier system of the store before payment, that a customer, or user of a mobile device, can take advantage of a purchase offer, e.g. a customized or personalized purchase offer, provided to the customer in response to identified events associated with the customer's mobile device and while the customer is present in the store.

In embodiments, the technology disclosed is directed to validating or verifying that a customer is authorized to take advantage of a purchase offer by providing a scannable and/or readable verification code, and more particularly to method and a system for capturing and acting on event data to provide secure verification of the customer's authorization to take advantage of the purchase offer by providing the scannable and/or readable verification code in response to events identified by the application program running on the mobile device. In embodiments and after receiving an optically readable code which contents at least partly represents the purchase offer, the customer typically needs to fetch the at least one physical product item of the purchase offer and bring the at least one physical item to the cash register desk or and/or a self-checkout terminal. At the desk and/or terminal, the image data representing the purchase offer, e.g. the optically readable code which contents represents the purchase offer, is displayed on the screen of the mobile device and is then shown to a staff member at the cash register desk or is scanned or read by a device. The scanning or reading may performed by using a device communicatively connected to the cashier system of the store, thereby validating or verifying that the user of the mobile device is authorized to take advantage of the purchase offer comprising the at least one physical product item brought to the cash register desk or and/or a self-checkout terminal.

In aspects, the technology disclosed is directed to a system and a method for providing a user of a mobile device with a purchase offer including at least one product available to customers in a store and while the user is present in the store, said method comprising:

a. acquiring or scanning, by an image acquisition component or scanner operatively connected to the mobile device, an image or barcode associated with a physical product item being offered for sale by the store, wherein said physical product item belongs to a first product or first product category;

b. transmitting, by said mobile device, said image or barcode, or data representing said image or barcode, to a control system which is comprising, or is at least one of operatively coupled to and communicatively connected to, a database;

c. transmitting, from the control system to the mobile device, data representing a purchase offer;

d. displaying, in a browser or an application program running on the mobile device and on the screen of said mobile device, data representing said purchase offer, wherein said step of displaying is performed in response to said mobile device receiving said data representing said purchase offer; and e. identifying, by the application program running on the mobile device, at least one event indicating the acceptance, by the user of the mobile device, of said purchase offer.

In embodiments, the technology disclosed is directed to a system configured to and a method which comprises the step of:

a. displaying, by the application program running on said mobile device, an optically readable code which content is representing said purchase offer or is reflecting the list of items currently in the shopping basket which includes the product items of said purchase offer.

In embodiments, the purchase offer is including at least the purchase of an item of said first product or first product category.

In embodiments, the purchase offer is including at least the purchase of an item of a second product or second product category different from said first product or first product category.

In embodiments, the technology disclosed is directed to a system configured to and a method which comprises the step of:

a. transmitting, from said mobile device to said control system, event data representing said at least one event indicating the acceptance of the purchase offer;

b. receiving, by the control system, said event data representing said at least one event indicating the acceptance of said purchase offer; and c. transmitting, from the control system to the mobile device, data adapted to be used for generating an optically readable code representing said purchase offer or reflecting the items currently in the shopping basket which includes the product items of said purchase offer, wherein said transmission of said data is performed in response to and triggered by said control system receiving said event In aspects, the technology disclosed is directed to a system and a method for providing a user of a mobile device with a purchase offer including at least one product available to customers in a store and while the user is present in the store, said method comprising:

a. scanning, by a scanner operatively connected to the mobile device, a barcode associated with a physical product item being offered for sale by the store, wherein said physical product item belongs to a first product or first product category;

b. transmitting, by said mobile device, said barcode, or data representing said barcode, to a control system which is comprising, or is at least one of operatively coupled to and communicatively connected to, a database;

c. transmitting, from the control system to the mobile device, data representing a purchase offer;

d. displaying, in a browser or an application program running on the mobile device and on the screen of said mobile device, data representing said purchase offer, wherein said step of displaying is performed in response to said mobile device receiving said data representing said purchase offer; and e. identifying, by the application program running on the mobile device, at least one event indicating the acceptance, by the user of the mobile device, of said purchase offer.

In embodiments, the technology disclosed is directed to a system configured to and a method which comprises the step of:

a. displaying, by the application program running on said mobile device, an optically readable code which content is representing said purchase offer or is reflecting the list of items currently in the shopping basket which includes the product items of said purchase offer.

Embodiments of the technology disclosed are directed to a system, a backend/control system, an application program installed on a mobile device and methods for providing, by the backend/control system, a purchase offer and then transmitting an optically readable/scannable verification code, by the backend/control system, following the acceptance of a purchase offer by the user of the mobile device and in response to event data identified by the application program and which represents at least one occurred event and/or action performed by the user of the mobile device (customer) while the user/customer is present in the store.

In aspects, the technology disclosed relates to a control system for providing a user of a mobile device with purchase offers including products available to customers in a store and while the user is present in the store, said control system is comprising or is at least one of operatively connected and communicatively coupled to a database and is configured to:

a. receive an image or barcode, or data representing an image or barcode associated with a physical first product item being offered for sale by the store, from a mobile device;

b. determine that said received image or barcode data belongs to a first product or first product category;

c. identify a purchase offer associated with the first product or first product category;

d. transmit, to said mobile device and in response to receiving said image or barcode data, data representing said purchase offer;

e. receive, from said mobile device, event data indicating that the user of the mobile device has accepted the purchase offer; and f. transmit, from the control system to said mobile device, an optically readable code representing said purchase offer or data adapted to be used for generating an optically readable code representing said purchase offer, wherein said optically readable code is adapted to validate or verify, when scanned or read, that the user of the mobile device is authorized to take advantage of said purchase offer and proceed to payment in accordance with the price and conditions of said purchase offer.

In embodiments, the technology disclosed relates to a control system for providing a user of a mobile device with purchase offers including products available to customers in a store and while the user is present in the store, said control system is configured to:

a. receive event data from a mobile device;

b. transmit, in response to receiving said event data, data representing a purchase offer to the same mobile device;

c. receive, from the same mobile device, event data indicating that the user of the mobile device has accepted the purchase offer; and d. transmit, from the control system to the same mobile device, data adapted to be used for generating an optically readable code representing said purchase offer, wherein said optically readable code, when scanned or read, is adapted to validate or verify that the user of the mobile device is authorized to take advantage of said purchase offer and may proceed to payment in accordance with the price and conditions of said purchase offer, and wherein said transmission of said data is performed in response to and triggered by said control system receiving said event data indicating that the user of the mobile device has accepted the purchase offer.

In embodiments, the purchase offer transmitted in step b above includes at least the purchase of an item of a second product or second product category different from said first product or first product category.

In embodiments, the technology disclosed relates to a method comprising the steps of:

a. transmitting, from said mobile device to said control system, event data representing said at least one event indicating the acceptance of said purchase offer;

b. receiving, by the control system, said event data representing said at least one event indicating the acceptance of said purchase offer;

c. transmitting, from the control system to the mobile device, data adapted to be used for generating an optically readable code representing said purchase offer or reflecting the items currently in the shopping basket which includes the product items of said purchase offer, wherein said transmission of said data is performed in response to and triggered by said control system receiving said event data representing said at least one event indicating the acceptance of said purchase offer;

d. generating, by the application program running on said mobile device, an optically readable code corresponding to said data adapted to be used for generating an optically readable code representing said purchase offer or reflecting the items currently in the shopping basket which includes the product items of said purchase offer; and e. displaying, by the application program running on said mobile device and on the screen of said mobile device, said optically readable code representing said purchase offer, wherein said optically readable code, when scanned or read, is adapted to validate or verify that the user of the mobile device is authorized to take advantage of said purchase offer and may proceed to payment in accordance with the price and conditions of said purchase offer.

In certain embodiments, the technology disclosed relates to a control system for providing a user of a mobile device with purchase offers including products available to customers in a retail store and while the user is present in the retail store, said control system is comprising or is at least one of operatively connected and communicatively coupled to a database and is configured to:

a. receiving a scanned barcode, or data representing a barcode, from a mobile device;

b. determining that said received barcode data is associated with a physical first product item being offered for sale by the retail store and that said first product item belongs to a first product or first product category;

c. identifying a purchase offer associated with the first product or first product category;

d. transmitting, in response to receiving said barcode data, data representing a purchase offer to the same mobile device, where said purchase offer include at least the purchase of an item of a second product or second product category different from said first product or first product category;

e. receiving, from the same mobile device, event data indicating that the user of the mobile device has accepted the purchase offer; and f. transmitting, from the control system to the same mobile device, data adapted to be used for generating an optically readable code representing said purchase offer, wherein said optically readable code, when scanned or read, is adapted to validate or verify that the user of the mobile device is authorized to take advantage of said purchase offer and proceed to payment in accordance with the price and conditions of said purchase offer, and wherein said transmission of said data is performed in response to and triggered by said control system receiving said event data indicating that the user of the mobile device has accepted the purchase offer.

In certain embodiments of the methods, systems and computer program products of the technology disclosed, the scanning or reading of the displayed optically readable code may automatically initiate a payment transaction for purchasing the at least one product item according to the price and conditions of the purchase offer provided to the customer's mobile device.

In embodiments, the event data received by the control system represents an event including at least one of the events of:

a. adding, to the shopping basket of the application program running on the mobile device, at least one item of a second product or second product category different from said first product or first product category;

b. adding, to the shopping basket of the application program running on the mobile device, product items in accordance with said purchase offer;

c. checking out, in the application program, at least one item of said second product or second product category for payment;

d. checking out, in the application program, product items in accordance with said purchase offer;

e. pressing a button, link, area or object in the application program to thereby request verification of the authorized use of said purchase offer; and f. activating an input means of the mobile device to thereby request verification of the authorized use of said purchase offer.

In embodiments, said purchase offer transmitted by the control system include at least the purchase of an item of a second product or second product category different from said first product or first product category.

In embodiments, the technology disclosed relates to control system for providing a user of a mobile device with purchase offers including products available to customers in a store and while the user is present in the store, said control system is configured to:

a. receive a scanned barcode, or data representing a barcode, from a mobile device;

b. determine that said received barcode data is associated with a physical first product item being offered for sale by the retail store and that said first product item belongs to a first product or first product category;

c. transmit, in response to receiving said barcode data, data representing a purchase offer to the same mobile device, where said purchase offer include at least the purchase of an item of a second product or second product category different from said first product or first product category;

d. receive, from the same mobile device, event data indicating that the user of the mobile device has accepted the purchase offer; and e. transmit, from the control system to the same mobile device, data adapted to be used for generating an optically readable code representing said purchase offer, wherein said optically readable code, when scanned or read, is adapted to validate or verify that the user of the mobile device is authorized to take advantage of said purchase offer and proceed to payment in accordance with the price and conditions of said purchase offer, and wherein said transmission of said data is performed in response to and triggered by said control system receiving said event data indicating that the user of the mobile device has accepted the purchase offer;

In aspects, the technology disclosed relates to an application program (APP) installed on a mobile device, said application program is configured to:

a. receive data representing a purchase offer;

b. display, in the application and on the screen of the mobile device, data representing said purchase offer;

c. identify the event of accepting, by the user of the mobile device, said purchase offer; and d. display an optically readable code adapted for validating or verifying that the user of the mobile device is authorized to take advantage of said purchase offer.

In embodiments, the application program is further configured to:

e. receive, from a control system, data adapted for at least one of generating and displaying said optically readable code; and f. display, in the application and on the screen of the mobile device, said optically readable code;

In certain embodiments, the application program is further configured to identify the at least one event indicating the acceptance of the purchase offer by the user by identifying at least one of the events of:

g. adding, to the shopping basket of the application program running on the mobile device, at least one item of a second product or second product category different from said first product or first product category;

h. adding, to the shopping basket of the application program running on the mobile device, product items in accordance with said purchase offer;

i. checking out, in the application program, at least one item of said second product or second product category for payment;

j. checking out, in the application program, product items in accordance with said purchase offer;

k. pressing a button, link, area or object in the application program to thereby request verification of the authorized use of said purchase offer; and l. activating an input means of the mobile device to thereby request verification of the authorized use of said purchase offer.

In embodiments, the technology disclosed relates to a method for providing a user of a mobile device with purchase offers including products available to customers in a store and while the user is present in the retail store, said method comprising:

a. acquiring, by an image acquisition component of the mobile device, an image of, or associated with, a physical product item in a store, wherein said physical product item belongs to a first product or first product category;

b. transmitting, by the mobile device, said image or data representing said image, wherein said image or data representing said image is adapted for identifying the c. receiving, by the mobile device, data representing a purchase offer;

d. displaying, in a browser or an application program running on the mobile device and on the screen of said mobile device, data representing said purchase offer, wherein said step of displaying is performed in response to said mobile device receiving said data representing said purchase offer;

e. identifying, by the application program running on the mobile device, the at least one event indicating the acceptance, by the user of the mobile device, of said purchase offer; and f. displaying, by the application program running on the mobile device, an optically readable code adapted for validating or verifying that the user of the mobile device is authorized to take advantage of said purchase offer.

In embodiments, the purchase offer of the above method may include at least the purchase of an item of a second product or second product category different from said first product or first product category.

In different embodiments, the image acquisition component may be any device component capable of capturing an image of information identifying a product. Such information may include, for example, an image of a bar code (e.g., universal product code (UPC), a matrix barcode (QR code), three-dimensional barcode, or European Article Number (EAN)) on a label affixed to product, an image of product itself, an image of all or a portion of the packaging of product, or any other image that includes information identifying the product.

In embodiments, the technology disclosed relates to an application program running on a mobile device configured to:

a. acquiring, by an image acquisition component of the mobile device, an image of, or associated with, a physical product item in a store, wherein said physical product item belongs to a first product or first product category;

b. transmitting, by the mobile device, said image or data representing said image, wherein said image or data representing said image is adapted for identifying the c. receiving, by the mobile device, data representing a purchase offer including at least the purchase of an item of a second product or second product category different from said first product or first product category;

d. displaying, in a browser or an application program running on the mobile device and on the screen of said mobile device, data representing said purchase offer, wherein said step of displaying is performed in response to said mobile device receiving said data representing said purchase offer;

e. identifying, by the application program running on the mobile device, the at least one event indicating the acceptance, by the user of the mobile device, of said purchase offer; and f. displaying, by the application program running on the mobile device, an optically readable code adapted for validating or verifying that the user of the mobile device is authorized to take advantage of said purchase offer.

In embodiments, the technology disclosed relates to an application program for running on a mobile device configured to:

a. display data representing said purchase offer, wherein said step of displaying is performed in response to receiving data representing said purchase offer;

b. identify the at least one event indicating the acceptance, by the user of the mobile device, of said purchase offer; and c. display an optically readable code adapted for validating or verifying that the user of the mobile device is authorized to take advantage of said purchase offer.

Embodiments of the technology disclosed are directed to a system, a backend/control system, an application program installed on a mobile device and methods for providing an optically readable code in real-time to a customer's mobile device where the optically readable code is adapted to be used for validating or verifying, in real-time while the customer (user of the mobile device) is present in the store, that the customer can, or is authorized to, take advantage of the purchase offer. In embodiments, the purchase offer may be a customized and/or personalized purchase offer created/constructed by the backend/control system at least partly based on event data received by the backend/control system from the mobile device of the customer and/or at least partly based on received from other mobile devices. The customized and/or personalized purchase offer may then be at least partly based on received event data reflecting the shopping behavior of the user of the user of the mobile device and/or reflecting the shopping behavior of users of other mobile devices/customers and may include certain deals and/or a customer-specified price, e.g. a customer-specified price for an aggregated purchase offer including both the first product and the second product and which may be offered only to the user of the mobile device.

In embodiments, the optically readable code, e.g. a QR-code, for validating or verifying that a customer can take advantage of a certain purchase offer may be adapted so that, when scanned by a scanner available in the store or read by camera of a device available in the store, the optically readable code represents the purchase offer, e.g. items, price and/or conditions of the purchase offer, and/or reflects/represents/corresponds to the product items of the current electronic/virtual shopping basket of the application program running on the mobile device, where the current electronic/virtual shopping basket may also include, in addition to the product items of the purchase offer, other product items added to the shopping basket by the user of the mobile device. Following the scanning or reading of the optically readable in the retail store to validate or verify that the user of the mobile device/customer is authorized to take advantage of the purchase offer, the customer may proceed to payment by conducting a purchase transaction in the store including at least the purchase of the product items according to the price, terms and/or conditions of the purchase offer.

In aspects, the technology disclosed relate to a method for providing a user of a mobile device with purchase offers including products available to customers in a retail store and while the user is present in the retail store, the method comprising:

a. acquiring, by an image acquisition component operatively connected to the mobile device, an image associated with a physical first product item being offered for sale by the retail store, wherein said image is adapted to be used for identifying that the first product item belongs to a first product or first product category;

b. transmitting, by said mobile device, said image, or data representing said image, to a control system which is comprising or is at least one of operatively connected and communicatively coupled to a database;

c. transmitting, from the control system to the mobile device, data representing a purchase offer including at least the purchase of an item of a second product or second product category different from said first product or first product category;

d. displaying, in a browser or an application program running on the mobile device and on the screen of said mobile device, data representing said purchase offer, wherein said step of displaying is performed in response to said mobile device receiving said data representing said purchase offer;

e. identifying, by the application program running on the mobile device, the at least one event indicating the acceptance, by the user of the mobile device, of said purchase offer;

f. transmitting, from said mobile device to said control system, event data representing said at least one event indicating the acceptance of said purchase offer.

According to embodiments, the method according to the technology disclosed further comprises the following steps prior to transmitting said data representing said purchase offer:

a. transmitting, from said control system to said mobile device, product and/or price information for said first product or first product category, wherein said product and/or price information for said first product is transmitted in response to receiving said image or data representing said image;

b. displaying said product and/or price information for said first product or first product category in the application cation c. identifying, by the application program running on the mobile device, an event associated with said first product or first product category, wherein said event comprises identifying at least one of the actions of adding at least one item of the first product or first product category to the shopping basket of the application program and checking out at least one item of the first product or first product category for payment; and d. transmitting, from the mobile device and in response to identifying said event associated with said first product or first product category, event data representing said event associated with said first product or first product category, wherein said step of transmitting data representing a purchase offer is performed in response to said control system receiving said event associated with said first product or first product category.

According to embodiments, the method according to the technology disclosed further comprises the following step prior to transmitting said data representing said purchase offer:

a. obtaining event data representing identified events associated with at least one of said first and said second product or product category, wherein said events are identified by other mobile devices than said mobile device and the event data transmitted in response to the occurrence of the events is received from other mobile devices than said mobile device, and wherein said events include at least one of the events of acquiring an image of a physical product item, the addition of an item to a shopping basket of the application program, checking out (in the application program) an item for payment and the confirmed purchase of a product item.

According to embodiments, the method according to the technology disclosed further comprises the following step prior to transmitting said data representing said purchase offer:

a. obtaining event data representing identified events, wherein said events are identified by and received from said same mobile device and indicates a certain shopping behavior of the user of the mobile device, and wherein said events include at least one of the events of acquiring an image of a physical product item, the addition of an item to a shopping basket of the application program, checking out (in the application program) an item for payment and the purchase of a product item.

According to embodiments, the method according to the technology disclosed further comprises creating/constructing the purchase offer at least partly based on previously obtained event data, i.e. event data obtained before the customer enters the store and scan a barcode label associated with, or identifying, a physical product item.

In certain embodiments, the purchase offer is created/constructed prior to at least one of said step of receiving said acquired image or data representing said acquired image associated with a physical first product item being offered for sale by the retail store and receiving event data associated with said first product or first product category, and wherein said purchase offer is at least partly based on at least one of event data reflecting the historical shopping behavior of the user of the mobile device and event data received from other mobile devices.

In certain embodiments, the purchase offer is created/constructed by the control system in response to at least one of the events of receiving said acquired image or data representing said acquired image associated with a physical first product item being offered for sale by the retail store and receiving event data associated with said first product or first product category, and wherein said purchase offer is at least partly based on at least one of the historical shopping behavior of the user of the mobile device and event data received from other mobile devices.

In aspects, the technology disclosed relates to a control system for providing a user of a mobile device with purchase offers including products available to customers in a retail store and while the user is present in the retail store, said control system is comprising or is at least one of operatively connected and communicatively coupled to a database and is configured to:

a. receiving an image, or data representing an image, from a mobile device;

b. determining that said received image data is associated with a physical first product item being offered for sale by the retail store and that said first product item belongs to a first product or first product category;

c. transmitting, in response to receiving said image data, data representing a purchase offer to the same mobile device, where said purchase offer include at least the purchase of an item of a second product or second product category different from said first product or first product category;

d. receiving, from the same mobile device, event data indicating that the user of the mobile device has accepted the purchase offer; and e. transmitting, from the control system to the same mobile device, data adapted to be used for generating an optically readable code representing said purchase offer, wherein said optically readable code, when scanned or read, is adapted to validate or verify that the user of the mobile device is authorized to take advantage of said purchase offer and proceed to payment in accordance with the price and conditions of said purchase offer, and wherein said transmission of said data is performed in response to and triggered by said control system receiving said event data indicating that the user of the mobile device has accepted the purchase offer;

In aspects, the technology disclosed relate to a method for providing a user of a mobile device with purchase offers including products available to customers in a retail store and while the user is present in the retail store, the method comprising:

a. scanning, by a scanner operatively connected to the mobile device, a barcode associated with a physical first product item being offered for sale by the retail store, wherein said first product item belongs to a first product or first product category;

b. transmitting, by said mobile device, said barcode, or data representing said barcode, to a control system which is comprising or is at least one of operatively connected and communicatively coupled to a database;

c. transmitting, from the control system to the mobile device, data representing a purchase offer including at least the purchase of an item of a second product or second product category different from said first product or first product category;

d. displaying, in a browser or an application program running on the mobile device and on the screen of said mobile device, data representing said purchase offer, wherein said step of displaying is performed in response to said mobile device receiving said data representing said purchase offer;

e. identifying, by the application program running on the mobile device, the at least one event indicating the acceptance, by the user of the mobile device, of said purchase offer;

f. transmitting, from said mobile device to said control system, event data representing said at least one event indicating the acceptance of said purchase offer.

According to embodiments, the method further comprising the steps of:

a. transmitting, from the control system to the mobile device, data adapted to be used for generating an optically readable code representing said purchase offer, wherein said transmission of said data is performed in response to and triggered by said control system receiving said event data;

b. generating, by the application program running on said mobile device, an optically readable code corresponding to said data adapted to be used for generating an optically readable code representing said purchase offer; and c. displaying, in the application program running on said mobile device and on the screen of said mobile device, said optically readable code representing said purchase offer, wherein said optically readable code, when scanned or read, is adapted to validate or verify that the user of the mobile device is authorized to take advantage of said purchase offer and proceed to payment in accordance with the price and conditions of said purchase offer.

According to embodiments, the method according to the technology disclosed further comprises the step of:

a. scanning, by a scanner operatively coupled to the cashier system of the retail store, said optically readable code, thereby validating or verifying that the user of the mobile device is authorized to take advantage of said purchase offer and proceed to payment.

According to embodiments, the method according to the technology disclosed further comprises:

a. conducting a payment transaction for purchasing at least one item of said second product or second product category and/or in accordance with the price and/or conditions of said purchase offer, wherein said payment transaction is conducted following said scanning of said optically readable code is validating or verifying that the user of the mobile device is authorized to take advantage of said purchase offer.

According to embodiments, the method according to the technology disclosed further comprises the following steps prior to transmitting said data representing said purchase offer:

e. transmitting, from said control system to said mobile device, product and/or price information for said first product or first product category, wherein said product and/or price information for said first product is transmitted in response to receiving said barcode or data representing said barcode;

f. displaying said product and/or price information for said first product or first product category in the application g. identifying, by the application program running on the mobile device, an event associated with said first product or first product category, wherein said event comprises identifying at least one of the actions of adding at least one item of the first product or first product category to the shopping basket of the application program and checking out at least one item of the first product or first product category for payment; and h. transmitting, from the mobile device and in response to identifying said event associated with said first product or first product category, event data representing said event associated with said first product or first product category, wherein said step of transmitting data representing a purchase offer is performed in response to said control system receiving said event associated with said first product or first product category.

According to embodiments, the method step of identifying said at least one event indicating the acceptance of said purchase offer comprises identifying, by the application program, at least one of the events/actions of:

a. adding, to the shopping basket of the application program running on the mobile device, at least one item of the second product or second product category b. adding to the shopping basket of the application program running on the mobile device, product items in accordance with said purchase offer;

c. checking out, in the application program, at least one item of said second product or second product category for payment; and d. checking out, in the application program, product items in accordance with said purchase offer and e. pressing a button, link, area or object in the application program, thereby requesting verification of the user's authorization to take advantage of said purchase offer According to embodiments, the method according to the technology disclosed further comprises the following step prior to transmitting said data representing said purchase offer:

a. obtaining event data representing identified events associated with at least one of said first and said second product or product category, wherein said events are identified by other mobile devices than said mobile device and the event data transmitted in response to the occurrence of the events is received from other mobile devices than said mobile device, and wherein said events include at least one of the events of scanning a barcode, the addition of an item to a shopping basket of the application program, checking out (in the application program) an item for payment and the confirmed purchase of a product item.

According to embodiments, the method according to the technology disclosed further comprises the following step prior to transmitting said data representing said purchase offer:

a. obtaining event data representing identified events, wherein said events are identified by and received from said same mobile device and indicates a certain shopping behavior of the user of the mobile device, and wherein said events include at least one of the events of scanning a barcode, the addition of an item to a shopping basket of the application program, checking out (in the application program) an item for payment and the purchase of a product item.

According to embodiments, the method according to the technology disclosed further comprises creating/constructing the purchase offer at least partly based on the obtained event data.

In certain embodiments, the purchase offer is created/constructed prior to at least one of said step of receiving said barcode or data representing said barcode associated with a physical first product item being offered for sale by the retail store and receiving event data associated with said first product or first product category, and wherein said purchase offer is at least partly based on at least one of the historical shopping behavior of the user of the mobile device and event data received from other mobile devices.

In certain embodiments, the purchase offer is created/constructed by the control system in response to at least one of the events of receiving said barcode or data representing said barcode associated with a physical first product item being offered for sale by the retail store and receiving event data associated with said first product or first product category, and wherein said purchase offer is at least partly based on at least one of the historical shopping behavior of the user of the mobile device and event data received from other mobile devices.

In aspects, the technology disclosed relates to a control system for providing a user of a mobile device with purchase offers including products available to customers in a retail store and while the user is present in the retail store, said control system is comprising or is at least one of operatively connected and communicatively coupled to a database and is configured to:

a. receiving a scanned barcode, or data representing a barcode, from a mobile device;

b. determining that said received barcode data is associated with a physical first product item being offered for sale by the retail store and that said first product item belongs to a first product or first product category;

c. transmitting, in response to receiving said barcode data, data representing a purchase offer to the same mobile device, where said purchase offer include at least the purchase of an item of a second product or second product category different from said first product or first product category;

d. receiving, from the same mobile device, event data indicating that the user of the mobile device has accepted the purchase offer; and e. transmitting, from the control system to the same mobile device, data adapted to be used for generating an optically readable code representing said purchase offer, wherein said optically readable code, when scanned or read, is adapted to validate or verify that the user of the mobile device is authorized to take advantage of said purchase offer and proceed to payment in accordance with the price and conditions of said purchase offer, and wherein said transmission of said data is performed in response to and triggered by said control system receiving said event data indicating that the user of the mobile device has accepted the purchase offer;

In embodiments, the control system is further configured to perform said step of transmitting data representing a purchase offer to the mobile device in response to receiving said barcode data.

In embodiments, the control system is further configured to perform said step of transmitting data representing a purchase offer to the mobile device in response to receiving event data from the mobile device, and where the event data is representing at least one of the actions of the user of the mobile device of adding at least one item of the first product or first product category to the shopping basket of the application program and checking out at least one item of the first product or first product category for payment.

In embodiments, the control system is further configured to perform the following step prior to transmitting said data representing said purchase offer:

a. transmitting, from said control system to said mobile device, product and/or price information for said first product or first product category, wherein said product and/or price information for said first product is transmitted in response to receiving said barcode or data representing said barcode.

In embodiments, the control system is further configured to perform the following step prior to transmitting said data representing said purchase offer:

a. obtaining event data representing identified events, wherein said events are identified by and received from said same mobile device and indicates a certain shopping behavior of the user of the mobile device, and wherein said events include at least one of the events of scanning a barcode, the addition of an item to a shopping basket of the application program, checking out (in the application program) an item for payment and the purchase of a product item.

In embodiments, the control system is further configured to perform the following step prior to transmitting said data representing said purchase offer:

a. obtaining event data representing identified events, wherein said events are identified by and received from said same mobile device and indicates a certain shopping behavior of the user of the mobile device, and wherein said events include at least one of the events of scanning a barcode, the addition of an item to a shopping basket of the application program, checking out (in the application program) an item for payment and the purchase of a product item.

In embodiments, the control system is further configured to perform the following step prior to transmitting said data representing said purchase offer:

a. creating/constructing said purchase offer at least partly based on said obtained event data.

In embodiments, the technology disclosed relates to a backend system, a mobile device and a method comprising:

receiving, at the backend system comprising at least one of a client database and one or more servers connected to a mobile device of an individual via a communication network, event data representing identified events recorded in real-time by the mobile device;

creating/constructing, by the backend system and based on previously received event data and transaction history of the mobile device of the individual and mobile devices of other customers, a purchase offer; and transmitting, by the backend system, the created/constructed purchase offer from the backend system to the mobile device, the transmitted purchase offer being sent by the backend system to the mobile device that displays the offer in real-time.

In embodiments, the technology disclosed relates to a backend system, a mobile device and a method comprising:

receiving, at the backend system comprising one or more servers connected to a mobile device of an individual via a communication network, event data from the mobile device and other mobile devices, where the received event data is representing identified events recorded in real-time by the mobile device;

creating/constructing, by the backend system and based on the received event data and transaction history of the individual and other customers, a purchase offer;

receiving, at the backend system comprising at least one of a client database and one or more servers connected to a mobile device of an individual via a communication network, event data representing identified events recorded in real-time by the mobile device; and transmitting, by the backend system, the created/constructed purchase offer from the backend system to the mobile device, the transmitted purchase offer being sent by the backend system to the mobile device that displays the offer in real-time.

In embodiments, the technology disclosed relate to a system and methods for providing in-store verification of purchase offers, the apparatus comprising:

a memory;

a computer processing device; and a module stored in the memory, executable by the computer processing device, and configured to:

receive a request from a consumer, wherein the request indicates the consumer's interest in validating or verifying a purchase offer receive by the customer while in-store;

determine the purchase offer based at least in part on the verification request, wherein determining the purchase offer comprises identifying, in a database, an optically readable code, or data for generating an optically readable code, representing the purchase offer in the request;

transmit, to the customer's mobile device, the optically readable code, or data for generating the optically readable code in response to the request, wherein the optically readable code is adapted to validate or verify that the customer is authorized to take advantage of the purchase offer; and display the optically readable code on the screen of the customer's mobile device.

In certain embodiments, the technology disclosed relates to a backend system configured to, following a first event of scanning a barcode associated with a first product and in response to a second event identified by a mobile device, transmit an optically readable code, where the optically readable code is indicating to reader (staff member) or a system of the store that the user of the mobile device is authorized to take advantage of an offer to purchase at least one item of the first product and at least one item of a second product different from the first product.

In certain embodiments, the technology disclosed relates to a backend system, e.g. comprising a client database, a data formatting unit and/or microservice architecture with application programming interfaces (APIs), configured to transmit data defining and representing an offer for sale, wherein said transmission of said offer for sale is preceded by said backend system receiving a barcode or first event data representing the event of scanning, by a mobile device, a barcode associated with a first product or product category, and wherein said offer for sale includes said first product or product category and, in addition, includes a second product or product category (for which no barcode associated with it typically was scanned by said mobile device prior to creating/constructing said offer for sale), and where said offer for sale is transmitted, from said backend system to said mobile device which scanned the barcode associated with said first product or product category, (automatically) in response to said backend system receiving second event data from said mobile device, and where said second event data is representing at least one of the occurred events of adding said offer for sale or said second product or product category to the electronic shopping basket of a mobile application program running on said mobile device, adding said second product or product category to said electronic shopping basket, and the activation of a check-out functionality, e.g. pressing a check-out button, in the mobile application program running on said mobile device, thereby proceeding to payment in accordance with said offer for sale and/or proceeding to payment of at least one item of said first product or product category and at least one item of said second product or product category. In embodiments, the above-mentioned offer for sale is created/constructed by the backend system based on at least one of obtained first, second and third event data associated with said first and second product which were previously received by said backend system from other mobile devices/customer and obtained first, second and third event data previously received from said mobile device, where said third event data is transmitted to and received by said backend system following a confirmed payment transaction of a product or product category.

An electronic shopping cart is a software typically used in eCommerce to assist customers to make purchases online. Upon checkout, the software calculates the total of the order, including shipping and handling, taxes and other parameters the owner of the web site has previously set. The technology disclosed relates to an electronic shopping cart and basket of a mobile application program running on a mobile device which may be used for receiving product information and taking advantage of offers for sale from a backend system while the user of the mobile device, i.e. the customer, is physically present in the store where the payment transactions for buying physical product items available in the store and which are related to or associated with the product information and offers for sale received in real-time from the backend system.

According to certain aspects of the technology disclosed, an electronic commerce tool, i.e. software or service, is the user-interface for the customer to use his mobile device to take advantage of offers from a backend system following the scanning of barcode in a retail store and while the customer is physically present in the store. In embodiments, the technology disclosed allows the customer, i.e. the user of a mobile device, which are physically present in the store to, in real-time, receive and take advantage of offers for sale in response to scanning barcodes in the store and then place items in accordance with said received offer in an electronic shopping basket of a mobile application program running on the mobile device. The cart of the mobile application program may be configured to remember these items added to the electronic shopping basket for a predetermined length of time, e.g. a timer may be used.

In embodiments, the technology disclosed relates to an in-store solution where event data is obtained based on consumer interactions with products at the retail location. Using a mobile device, an image of a product item belonging to a first product is acquired that identifies said first product being offered for sale by a retail store. The image, or data representing the acquired image, is transmitted to a backend system such as a purchase server, which, in return sends product information for the first product back to the mobile device, where it is displayed in a mobile application running on the mobile device. A first event representing a decision by the consumer to move forward with a purchase of the first product is identified and first event information about the decision to move forward is transmitted from the mobile device to the backend system. The first event information is transmitted to the backend system, which, in return sends information representing an aggregate purchase offer, including the purchase of a first item of said first product and at least one of at least one additional item of the first product and at least one item of a second product different from the first product, back to the mobile device, where said aggregate purchase offer is displayed in the mobile application.

According to embodiments of the present invention, a second event representing a decision by the consumer to accept said aggregate purchase offer is identified and second event information about the decision to accept said aggregate purchase offer is transmitted from the mobile device to the backend system. The second event information is transmitted to the backend system, which, in return automatically sends an optically readable code, e.g. a QR-code, back to the mobile device, where said optically readable code is displayed in the mobile application running on the mobile device.

In embodiments, said optically readable code displayed in the mobile application of the mobile device is configured to be scanned by at least one optical scanner at the retail location to thereby confirm the authorization of said aggregate purchase offer including said first item of said first product, of which an image initially was acquired by the mobile device, and at least one of at least one additional item of the first product and at least one item of a second product different from said first product. In different embodiments, the at least one optical scanner may be at least one of operatively coupled to at least one of the cashier machines of a retail store, at least one of the mobile devices operated by the staff at a retail store and a self-service check-out station at a retail store. According to embodiments and in operation, the mobile device displays an optically readable code (e.g., a QR code or other barcode). As noted above, this optically readable code may correspond (e.g., uniquely) to aggregate purchase offer. Furthermore and according to embodiments of the technology disclosed, the optically readable code may be automatically generated and then displayed on the screen of the mobile device following the at least one event/action of the user of the mobile device indicating the acceptance by the user of the aggregate purchase offer and in response to the backend system receiving the second event information from the same mobile device that first scanned the image, e.g. barcode, identifying said first product being offered for sale by the retail store.

According to embodiments and in operation, the optical scanner at the retail store scans or otherwise reads the optically readable code (e.g., the QR code) being displayed by the mobile application/screen of the mobile device. According to various example embodiments, operation may be performed using a camera of the optical scanner and may be performed in response to the executing of an application program in operation.

In embodiments, the technology disclosed relates to a method in a system including a backend system and a retail store with product items and at least one mobile device comprising a mobile application program running on said mobile device, comprising:

a. scanning, by a mobile device, a barcode associated with a product item of a first product or product category;

b. transmitting, from said mobile device and in response to said first event of scanning said barcode, at least one of said barcode and data representing said scanning of said barcode, c. transmitting, from the backend system and in response to said backend system receiving said at least one of said barcode and data representing said scanning of said barcode from said mobile device, product information related to said first product or product category;

d. receiving, at the mobile device, said product information related to said first product or product category;

e. presenting, in the mobile application program and on the screen of said mobile device, product information associated with said first product or product category, wherein said presented product information is at least partly based on said product information related to said first product or product category;

f. identifying, by said mobile application program running on said mobile device, a first event, wherein said first event comprises at least one of the events or a combination of the events of adding at least one item of said first product or product category to the electronic shopping basket and checking-out at least one item of said first product or product category for payment;

g. transmitting, from said mobile device and in response to said identifying of said first event, first event data representing said identified first event;

h. transmitting, from said backend system and in response to receiving said first event data from said mobile device, an offer for sale which comprises at least one item of said first product or product category and at least one item of a second product or product category different from said at least one item of said first product or product category;

i. presenting, in the mobile application program and on the screen of said mobile device, said offer for sale;

j. identifying, in the mobile application program of said mobile device, a second event representing the acceptance by the user of the mobile device of said offer for sale, wherein said second event comprises at least one of the events or a combination of the events of adding at least one item of said second product or product category to the electronic shopping basket and checking-out at least one item of said second product or product category for payment;

k. generating an optically readable code representing said offer for sale, wherein said optically readable code is one of generated by said mobile application program of said mobile device and by said backend system in response to receiving second event data representing said second event; and l. presenting, in the mobile application program and on the screen of said mobile device, said optically readable code, wherein said optically readable code is adapted to be scanned by a scanner at the store and, when scanned, confirm to the staff at the store that the user of said mobile device is authorized to purchase at least one item of said first product or product category and at least one item of said second product or product category according to the conditions of said offer for sale.

In embodiments, the technology disclosed relates to a method in a system including a backend system and a retail store with product items and at least one mobile device comprising a mobile application program running on said mobile device, comprising:

a. scanning, by a mobile device, a barcode associated with a product item of a first product or product category;

b. transmitting, from said mobile device and in response to said first event of scanning said barcode, at least one of said barcode and data representing said scanning of said barcode, c. transmitting, from the backend system and in response to said backend system receiving said at least one of said barcode and data representing said scanning of said barcode from said mobile device, product information related to said first product or product category;

d. receiving, at the mobile device, said product information related to said first product or product category;

e. presenting, in the mobile application program and on the screen of said mobile device, product information associated with said first product or product category, wherein said presented product information is at least partly based on said product information related to said first product or product category;

f. identifying, by said mobile application program running on said mobile device, a first event, wherein said first event comprises at least one of the events or a combination of the events of adding at least one item of said first product or product category to the electronic shopping basket and checking-out at least one item of said first product or product category for payment;

g. transmitting, from said mobile device and in response to said identifying of said first event, first event data representing said identified first event;

h. transmitting, from said backend system and in response to receiving said first event data from said mobile device, an offer for sale which comprises at least one item of said first product or product category and at least one item of a second product or product category different from said at least one item of said first product or product category;

i. presenting, in the mobile application program and on the screen of said mobile device, said offer for sale;

j. identifying, in the mobile application program of said mobile device, a second event representing the acceptance by the user of the mobile device of said offer for sale, wherein said second event comprises at least one of the events or a combination of the events of adding at least one item of said second product or product category to the electronic shopping basket and checking-out at least one item of said second product or product category for payment;

k. generating an optically readable code representing said offer for sale, wherein said optically readable code is one of generated by said mobile application program of said mobile device and by said backend system in response to receiving second event data representing said second event;

l. presenting, in the mobile application program and on the screen of said mobile device, said optically readable code; and m. scanning, by a scanner at the store, said optically readable code presented on the screen of said mobile device, thereby authorizing the purchase of at least one item of said first product or product category and at least one item of said second product or product category according to the conditions of said offer for sale.

In embodiments, the technology disclosed relates to a method in a system including a backend system and a retail store with product items and at least one mobile device comprising a mobile application program running on said mobile device, comprising:

a. scanning, by a mobile device, a barcode associated with a product item of a first product or product category;

b. transmitting, from said mobile device and in response to said first event of scanning said barcode, at least one of said barcode and data representing said scanning of said barcode, c. transmitting, from the backend system and in response to said backend system receiving said at least one of said barcode and data representing said scanning of said barcode from said mobile device, product information related to said first product or product category;

d. receiving, at the mobile device, said product information related to said first product or product category;

e. presenting, in the mobile application program and on the screen of said mobile device, product information associated with said first product or product category, wherein said presented product information is at least partly based on said product information related to said first product or product category;

f. identifying, by said mobile application program running on said mobile device, a first event, wherein said first event comprises at least one of the events or a combination of the events of adding at least one item of said first product or product category to the electronic shopping basket and checking-out at least one item of said first product or product category for payment;

g. transmitting, from said mobile device and in response to said identifying of said first event, first event data representing said identified first event;

h. transmitting, from said backend system and in response to receiving said first event data from said mobile device, an offer for sale which comprises at least one item of said first product or product category and at least one item of a second product or product category different from said at least one item of said first product or product category;

i. presenting, in the mobile application program and on the screen of said mobile device, said offer for sale;

j. identifying, in the mobile application program of said mobile device, a second event representing the acceptance by the user of the mobile device of said offer for sale, wherein said second event comprises at least one of the events or a combination of the events of adding at least one item of said second product or product category to the electronic shopping basket and checking-out at least one item of said second product or product category for payment;

k. generating an optically readable code representing said offer for sale, wherein said optically readable code is one of generated by said mobile application program of said mobile device and by said backend system in response to receiving second event data representing said second event; and l. presenting, in the mobile application program and on the screen of said mobile device, said optically readable code, wherein said optically readable code is adapted to be scanned by a scanner at the store and, when scanned, confirm to the staff at the store that the user of said mobile device is authorized to purchase at least one item of said first product or product category and at least one item of said second product or product category according to the conditions of said offer for sale.

In embodiments, the technology disclosed relates to a method in a system including a backend system and a retail store with product items and at least one mobile device comprising a mobile application program running on said mobile device, comprising:

a. scanning, by a mobile device, a barcode associated with a product item of a first product or product category;

b. transmitting, from said mobile device and in response to said first event of scanning said barcode, at least one of said barcode and data representing said scanning of said barcode, c. transmitting, from the backend system and in response to said backend system receiving said at least one of said barcode and data representing said scanning of said barcode from said mobile device, product information related to said first product or product category;

d. receiving, at the mobile device, said product information related to said first product or product category;

e. presenting, in the mobile application program and on the screen of said mobile device, product information associated with said first product or product category, wherein said presented product information is at least partly based on said product information related to said first product or product category;

f. identifying, by said mobile application program running on said mobile device, a first event, wherein said first event comprises at least one of the events or a combination of the events of adding at least one item of said first product or product category to the electronic shopping basket and checking-out at least one item of said first product or product category for payment;

g. transmitting, from said mobile device and in response to said identifying of said first event, first event data representing said identified first event;

h. transmitting, from said backend system and in response to receiving said first event data from said mobile device, an offer for sale which comprises at least one item of said first product or product category and at least one item of a second product or product category different from said at least one item of said first product or product category;

i. presenting, in the mobile application program and on the screen of said mobile device, said offer for sale;

j. identifying, in the mobile application program of said mobile device, a second event representing the acceptance by the user of the mobile device of said offer for sale, wherein said second event comprises at least one of the events or a combination of the events of adding at least one item of said second product or product category to the electronic shopping basket and checking-out at least one item of said second product or product category for payment;

k. generating an optically readable code representing said offer for sale, wherein said optically readable code is one of generated by said mobile application program of said mobile device and by said backend system in response to receiving second event data representing said second event;

l. presenting, in the mobile application program and on the screen of said mobile device, said optically readable code; and m. scanning, by a scanner at the store, said optically readable code presented on the screen of said mobile device, thereby authorizing the purchase transaction of at least one item of said first product or product category and at least one item of said second product or product category according to the conditions of said offer for sale.

In embodiments, the technology disclosed relates to a method in a system including a backend system and a retail store with product items and at least one mobile device comprising a mobile application program running on said mobile device, comprising:

a. scanning, by a mobile device, a barcode associated with a product item of a first product or product category;

b. transmitting, from said mobile device and in response to said first event of scanning said barcode, at least one of said barcode and data representing said scanning of said barcode, c. transmitting, from the backend system and in response to said backend system receiving said at least one of said barcode and data representing said scanning of said barcode from said mobile device, product information related to said first product or product category;

d. receiving, at the mobile device, said product information related to said first product or product category;

e. presenting, in the mobile application program and on the screen of said mobile device, product information associated with said first product or product category, wherein said presented product information is at least partly based on said product information related to said first product or product category;

f. identifying, by said mobile application program running on said mobile device, a first event, wherein said first event comprises at least one of the events or a combination of the events of adding at least one item of said first product or product category to the electronic shopping basket and checking-out at least one item of said first product or product category for payment;

g. transmitting, from said mobile device and in response to said identifying of said first event, first event data representing said identified first event;

h. transmitting, from said backend system and in response to receiving said first event data from said mobile device, an offer for sale which comprises at least one item of said first product or product category and at least one item of a second product or product category different from said at least one item of said first product or product category;

i. presenting, in the mobile application program and on the screen of said mobile device, said offer for sale;

j. identifying, in the mobile application program of said mobile device, a second event representing the acceptance by the user of the mobile device of said offer for sale, wherein said second event comprises at least one of the events or a combination of the events of adding at least one item of said second product or product category to the electronic shopping basket and checking-out at least one item of said second product or product category for payment;

k. generating an optically readable code representing said offer for sale, wherein said optically readable code is one of generated by said mobile application program of said mobile device and by said backend system in response to receiving second event data representing said second event;

l. presenting, in the mobile application program and on the screen of said mobile device, said optically readable code; and m. scanning, by a scanner operatively coupled to the cashier system of the store, said optically readable code presented on the screen of said mobile device, thereby authorizing the purchase of at least one item of said first product or product category and at least one item of said second product or product category according to the conditions of said offer for sale; and n. conducting, by the cashier system, a purchase transaction or withdrawal from an account associated with the user of the mobile device according to the conditions of said offer for sale.

BRIEF DESCRIPTION OF DRAWINGS

Preferred embodiments of a system according to the technology disclosed will be described more in detail below with reference to the accompanying drawings wherein.

DETAILED DESCRIPTION

Figure 1:
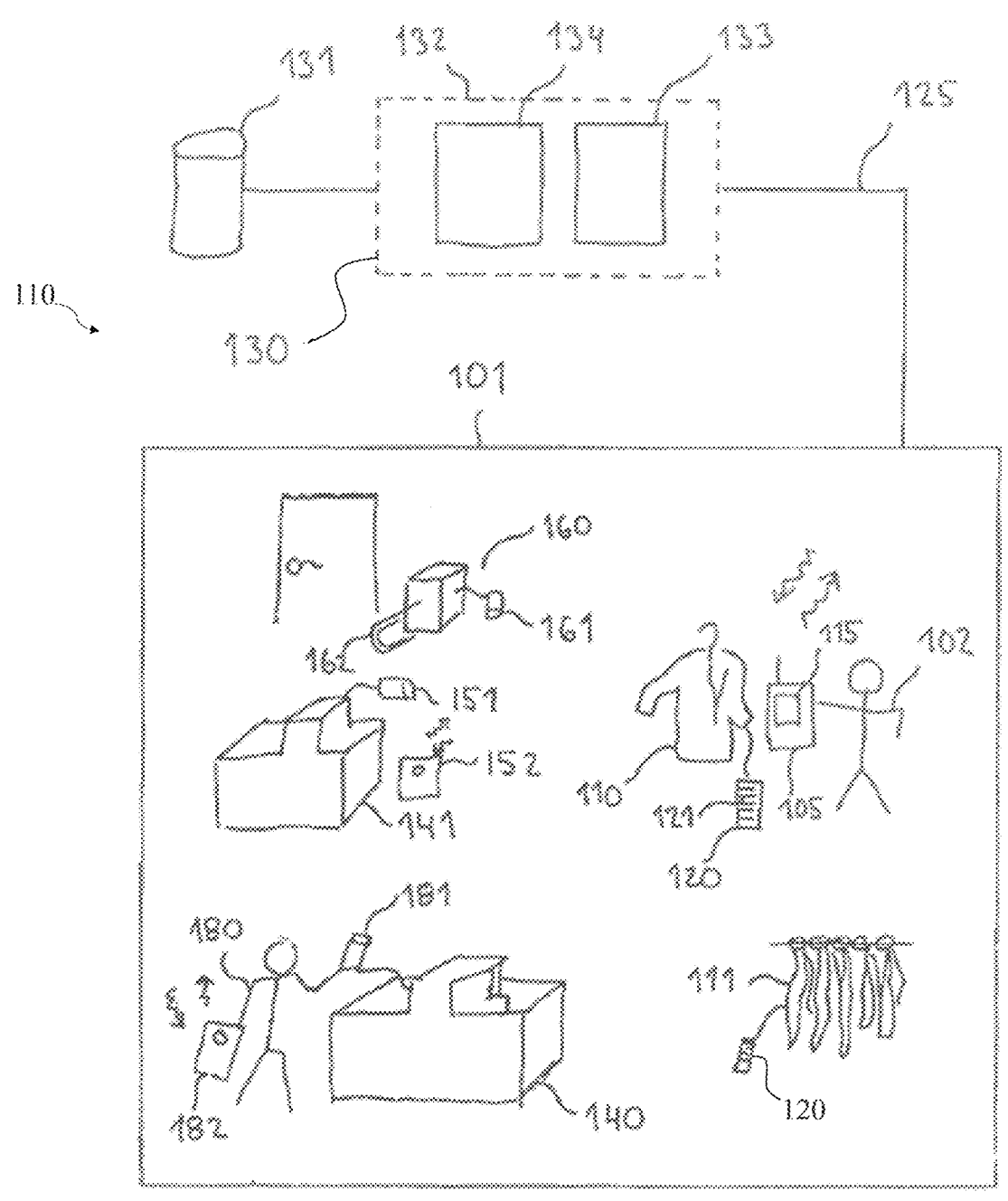
FIG. 1 illustrates a system according to embodiments of the technology disclosed.

In the drawings, similar details are denoted with the same reference number throughout the different embodiments. In the various embodiments of the system according to the technology disclosed, the different subsystems are denoted. The "boxes"/subsystems shown in the drawings are by way of example only and can within the scope of the technology disclosed be arranged in any other way or combination.

Internet-based retail merchants have utilized electronic shopping carts on their ecommerce websites to allow consumers to shop throughout the site and check-out once completed. One advantage of the online cart is that merchants can capture virtually any consumer events as each action creates a unique record, e.g. a HTTP event, database transaction, script execution, or other data processing result.

Many of these events, such as events indicating the acceptance of a purchase offer provided to the customer's mobile device or the event of conducting a payment transaction including a purchase offer provided to the customer's mobile device, are simply not obtained by the backend system, and are therefore typically not captured as part of the in-store shopping experience. Furthermore, there is no solution available today where a backend system is capturing event data and providing an optically readable code adapted for validating or verifying that the customer is authorized to take advantage of a purchase offer in response to events identified by a mobile application program (APP) running on a mobile device.

Another example of such an event is the adding of a second product, which is not scanned by the customer, to an electronic shopping cart event where the second product is a product item of a purchase offer provided in response to the scanning of a barcode associated only with a first product item of the purchase offer. On online sales, a shopping cart describes an event, or series of events, during which a consumer selects a first item places it in their electronic shopping cart, effectively adding the item to their order. For example, a consumer may add the second product item to their cart following the receipt of the purchase offer, and then complete a transaction including both the first and the second product of the purchase offer.

Other events, such as the user of the mobile device's acceptance of an aggregate or combined purchase offer including a first and second product item by adding the aggregate purchase offer to the shopping basket of the mobile application program following the scanning of a barcode associated with the first product item belonging to a first product different from the second product, are also not captured as part of the offline shopping experience. Furthermore, there is no solution available today for a backend system, e.g. purchase server, of capturing and acting in response to the acceptance by the user of the mobile device of such an aggregate purchase offer without the user having to scan a barcode associated with a second product item belonging to the second product.

The inventors have recognized and appreciated that the use of personal, mobile devices as point-of-sale ("POS") apparatus provides numerous opportunities to enhance the in-store shopping experience for consumers and allows merchants and brand companies to capture and analyze data previously not accounted for. For example, a consumer may select, view, touch, listen to, or otherwise interact with a product in the store. Unlike returns, which can be easily tracked as two distinct transactions (a purchase and a return), a "non-purchase" cannot be easily traced. In other instances, the consumer may view a product, and, while deciding whether to make the purchase, use a mobile device to search for a better deal elsewhere. In still other cases, the consumer may decide to purchase multiple products, but, due to various logistical or timing constraints, only want to leave the store with a subset of the products, while having the balance of her order shipped or delivered to her at another time.

In embodiments, the technology disclosed relates to a system, methods and computer program products for capturing and acting in response to a sequence of events or subsequently received event data, e.g. automatically and in real-time, in order to display an optically readable code for validating or verifying on the screen of the customer's mobile device that the customer is authorized to take advantage of a purchase offer provided to the customer while in the store.

The optically readable code may, for example, be a matrix barcode (QR code), a universal product code (UPC), a three-dimensional barcode, or European Article Number (EAN).

A QR code is one of the most well-known kinds of 2D barcodes. QR codes are designed from a pattern of black squares configured on a white background. The code can retain data much like a regular barcode you see on an article of clothing or on food products that are scanned at the checkout counter for information about price and other data. The QR code pattern has the possibility of retaining much more data than typical barcodes. The kind of information and size of the code determine how much data each code can hold.

Certain examples of the technology disclosed provide a control system including a processor configured to receive a trigger in the form of event data to initiate an optically readable code query in response to or based at least in part on the receiving of event data which was transmitted from a mobile device in response to the identifying of an event indicating the acceptance of a purchase offer by the user of the mobile device. The example control system may include at least one engine configured to dynamically create subsequent purchase offers and discount codes in response to receiving event data from mobile devices. The example control system may also include a validation engine configured to search and retrieve optically readable codes or data for generating and/or displaying optically readable codes on the screen of the mobile device. An example engine may be configured to provide one or more identified optically readable codes to a target mobile device to thereby determine the validity of each purchase offer. The example processor is to dynamically provide optically readable codes presented on a customer's mobile device in response to receiving event data representing the acceptance of a purchase offer. The optically readable code, when viewed, scanned or read, determines the validity of the previously provided purchase offer and may be used for validating or verifying to a computer unit, cashier system and/or staff member in a store that the user of a mobile device displaying the optically readable code is authorized to take advantage of the purchase offer.

Certain examples provide a method including initiating, by the control system and based on a trigger in the form of received event data, an optically readable code or data for generating and/or displaying an optically readable code on the screen of a mobile device. The example method includes searching for and retrieving optically readable codes using a processor. The example method includes providing, using the processor without further user input, an identified subsequent purchase offer or discount in the form of an optically readable code to a customer's mobile device, where the optically readable code, when scanned or read, determines the validity of the purchase offer. The example method includes dynamically providing one or more purchase offers or discounts to a customer's mobile device, or a group of customer's mobile device, in response to receiving, by the control system, event data representing the identification of an event indicating the acceptance of a purchase offer by the same customer.

Certain examples provide a tangible computer-readable storage medium including computer program instructions which, when executed by a processor, are to implement a method. The example method includes providing, based on a trigger, an optically readable code query based at least in part on event data received by the control system. The example method includes searching for and retrieving optically readable codes. The example method includes providing, using the processor without further user input, one or more identified optically readable codes which may be used to determine the validity of each purchase offer. The example method includes dynamically providing one or more optically readable codes to customer's mobile device in response to received event data indicating the acceptance, by the customer, of a purchase offer previously provided by the control system.

Various embodiments of the invention related to methods and systems for enabling the implementation of various in-store purchase options, as well as the capture of information related to purchases and non-purchases alike. While specific examples may vary, certain implementations provide an application that may be downloaded to or come as a native application on a consumer mobile device that enables consumers to indicate if and why a purchase may be completed, provide delivery checkout instructions, and compare prices and other transaction details across multiple merchants, all while remaining in the store.

Using the techniques and systems described herein, merchants will gain access to data related to complete and incomplete purchases and be able to offer more flexible and validly verified purchase offers to consumers shopping instore. Unlike online shopping experiences during which a consumer's interaction with a product is limited to viewing on a screen, in-store shopping allows a consumer to pick up, touch and inspect a product. For example, a consumer may pick up and scan an item using her mobile device to learn more information about the product (price, discounts, warranty, ratings, delivery costs and options, etc.) and decide to check-out or add the product to the shopping basket in the mobile application program running on the mobile device.

As mentioned above, there is no solution available today for providing in-store purchase offers and subsequently validating or verifying, in real-time, that the customer is authorized to take advantage of purchase offers accepted by the customer while in-store. In particular, there are no solution available today where a backend/control system is used for validating or verifying that a user of a mobile device is authorized to take advantage of a purchase offer provided by the same backend/control system in response to events related to the identification of physical product items available in the store, and where the events are performed by the customer while the customer is present in the store and identified by a mobile application program (APP) running on the customer's mobile device. The events may, for example, represent decisions made by the customer of acquiring an image associated with a first physical product item available for sale in the store and proceeding with a purchase offer presented in real-time to the customer while in-store, where the purchase offer, which is displayed on the user's mobile device, includes at least one second product or product category available for sale in the store and which is different from the first product or product category to which the first physical product item belongs.

Decisions which are made by the customer, i.e. the user of the mobile device, not only provides valuable information to the retailer and the brand, but also provide opportunities to turn knowledge about a shown interest about a first product into a subsequent or aggregate purchase including a second product, e.g. event data or information related to a first product which is obtained by a backend system in real-time while the customer is in the store, e.g. identification of occurred events reflecting the customer's interest in proceeding with purchasing a first product while the customer is present in the store, may be used to create/construct and/or present an purchase offer in real-time to the customer which comprises a subsequent, combined or aggregate purchase offer including the additional purchase of a second product, e.g. at a discounted price.

The technology disclosed is generally directed to systems, methods and computer program products for providing in-store product information and purchase offers. According to different example embodiments, the control system, or backend system, is configured to receive, from a consumer's mobile device, event data indicating the consumer's interest in purchasing products available at a store and then subsequently provide product information, purchase offers based on previously obtained event data, and an optically readable code for verification in the store. In embodiments, an optically readable code is displayed on the customer's mobile device in response to an event identified by an application program running on the customer's mobile device, where the contents of each optically readable code provided to a customer is adapted to be used for validating or verifying that the customer is authorized to take advantage of a certain purchase offer. In embodiments, the present invention relates to the acquisition of an image identifying a first product and, in response to the acquired image, event data representing the event of acquiring the image and/or a subsequent event identified by the application program, the consumer is provided with a purchase offer including at least a second product different from the first product identified by the acquired image.

The system, methods and computer program products of the technology disclosed provides the customer with purchase offers while the customer is present in a store in which products of the purchase offer are available.

In embodiments, the technology disclosed relates to a system, methods and computer program products for capturing and acting in response to a sequence of events or subsequently received event data, e.g. automatically and in real-time, in order to provide a purchase offer comprising both a first physical product in the store which associated barcode was scanned or read by the mobile device receiving the purchase offer and a second product which associated barcode the mobile device was not scanned or read before receiving the purchase offer. After first receiving and then accepting the purchase offer, the customer typically needs to fetch at least one physical item of the second product and bring the at least one physical item of the first product and the at least one physical item of the second product to the cash register desk or and/or a self-checkout terminal. At the desk and/or terminal, the image data representing the purchase offer, e.g. an optically readable code which contents represents the purchase offer, is displayed on the screen of the mobile device and is then shown to a staff member at the cash register desk or is scanned or read by a device. The scanning or reading may performed by using a device communicatively connected to the cashier system of the store, thereby validating or verifying that the user of the mobile device is authorized to take advantage of the purchase offer comprising at least one item of the first product and at least one item of the second product.

In embodiments, data for generating and/or displaying the purchase offer, or data which is representing the purchase offer, is provided by the control system to a predetermined group of mobile devices including the mobile device in response to the control system receiving a barcode or image data following the scanning, by the mobile device, of a barcode, or acquiring of an image, associated with the physical product item in the store where the barcode or image is adapted for identifying, by the control system, a first product or product category to which the physical product item belongs. The purchase offer may then be determined, retrieved and/or created/constructed by the control system in response to identifying the first product or first product category and data for generating and/or displaying the purchase offer on the displays of the predetermined group of mobile devices including the mobile device performing the scanning/acquiring may be transmitted in response to determining, retrieving and/or created/constructing the purchase offer.

In certain embodiments, the purchase offer may then have been previously created/constructed at least partly based on event data received, by the control system, from a plurality of mobile devices among the predetermined group of mobile devices including the mobile device. The purchase offer may also or in addition have been previously created/constructed at least partly based on event data received from other mobile devices outside the predetermined group of mobile devices where the event data is associated with events associated with the first product or first product category and/or a second product or second product category which is a part of the purchase offer. The purchase offer may also have been created/constructed, by the control system, at least partly based on content that the control system has gathered or received from social media. The control system may then be configured to dynamically create/construct or change purchase offers based on the event data that the control system receives from mobile devices and/or contents that the control system receives or retrieves from social media platforms such as Twitter, Facebook and Instagram.

In embodiments, the provided purchase offer, including at least one item of the first product, which associated barcode was scanned before receiving the purchase, and at least one item of a second product different from the first product, where the combined purchase offer is at least partly based on previously received event data, i.e. received before the customer entered the store. The combined offer, including both the first product which physical product item's associated barcode label was scanned or read by the mobile device and the second product may then be created/constructed, e.g. dynamically created/constructed, at least partly based on identified and/or received events and/or event data obtained before the customer entered the store, where the events and/or event data was identified by and/or received from at least one of the customer's own mobile device and the mobile devices of other customers. The previously identified and/or received events and/or event data may then be associated with previously performed purchases of items of the first product and of the second product, e.g. combined or aggregated purchases including at least one item of the first product and at least one item of the second product.

In aspects, the system, methods adapted for validly and computer program products of the technology disclosed are adapted for securely validating or verifying, to the staff member at the store and/or the cashier system of the store before payment, that a customer, or user of a mobile device, can take advantage of a purchase offer, e.g. a customized or personalized purchase offer, provided to the customer in response to identified events associated with the customer's mobile device and while the customer is present in the store.

In embodiments, the optically readable code also includes payment credentials of the customer associated with the mobile device and the payment transaction is conducted automatically in response to said scanning or acquiring of an image of said optically readable code by a scanner or an image acquisition device operatively coupled to or communicatively connected to the cashier system of the store.

In certain embodiments of the methods, systems and computer program products of the technology disclosed, the scanning or reading of the displayed optically readable code may automatically initiate a payment transaction for purchasing the at least one product item according to the price and conditions of the purchase offer provided to the customer's mobile device, e.g. by automatically providing, by the controls system, the payment credentials of the customer in response to the scanning or reading of the optically readable code.

FIG. 1 illustrates a system 100 in which a mobile device 105 (e.g., a mobile telephone, personal digital assistant, smartphone, or other handheld device such as an iPhone or Android-based device) may be used to purchase a product 110 from a store 110xt, in accordance with some embodiments of the present disclosure. Mobile device 105 may be any mobile device having a processing capability, such as a cellular phone or a personal digital assistant (PDA). Mobile device 105 may be operatively connected to an image acquisition component 115, for example a camera integrated into the mobile device 105. Image acquisition component 115 may be any device component capable of capturing an image of information identifying a product. Such information may include, for example, an image of a barcode (e.g., universal product code (UPC), a matrix barcode (QR code), three-dimensional barcode, or European Article Number (EAN)) on a label 120 affixed to product 110, an image of product 110 itself, an image of all or a portion of the packaging of product 110, or any other image that includes information identifying the product 110. In some embodiments, the image acquisition component 115 may further include optical character recognition capabilities, such that product names, brands, serial numbers, product numbers, or other text-based information may be read, digitally represented, and used in accordance with various implementations of the invention. In the examples below, label 120 is described as being a barcode. However, this provided merely as an example, as label 120 may be any product identifying number or may be any other information usable to identify product 110.

When a user of mobile device 105 intends to purchase a product 110 in the store 101, the user may use the image acquisition component 115 of the mobile device 105 to obtain an image that includes the product's barcode label 120 or other information identifying the product 110. The mobile device 105 may be programmed with an application program to communicate with a control system 130, or backend system, to capture events and transactions representing the user's interaction with the product 110 and, if desired, facilitate the purchase of products such as product 110. The application program may be installed on the mobile device in any of a number of ways. For example, the user may download the application program to the mobile device 105 from a developer of the application, from the control system 130, from the retail establishment, or from any other suitable source.

The control system 130, or backend system, may have access to any of various image recognition processes by which the barcode 121 of product 110 may be determined from the image taken of the barcode label 120. The control system 130 may also have access to product information for the product 110, including, for example, description and price information, through communication with a client database 131. Once control system 130 determines the barcode of the product 110, the control system 130 may transmit the corresponding product information to mobile device 105, in response to receiving from the mobile device the image taken of the barcode label 120.

In embodiments, the technology disclosed relates to a system, methods and computer program products for capturing and acting in response to a sequence of events or subsequently received event data, e.g. automatically and in real-time, in order to provide a purchase offer comprising both a first physical product 110 in the store 101 which associated barcode label 120 was scanned or read by the mobile device 105 receiving the purchase offer and a second product 110y which associated barcode the mobile device was not scanned or read before receiving the purchase offer.

In example embodiments, the control system 130 may comprise a client database 131, or construct based on obtained event data, different purchase offers, e.g. personalized or customized purchase offers, which include at least one item of the first product 110 and at least one item of a second product 111, or the control system 130 may have access to purchase offers by retrieving information from, or through communication with, the client database 131. Once control system 130 determines the barcode 121 of the product 110, the control system 130 may transmit the corresponding product information to mobile device 105, in response to receiving from the mobile device the image taken of the barcode label 120.

After first receiving and then performing actions in the application program indicating the acceptance of the purchase offer by the customer 102, the customer 102 typically fetch at least one physical item of the second product 111 and bring the at least one physical item of the first product 110 and the at least one physical item of the second product 111 to a cash register desk 140 or and/or a self-checkout terminal 141. At the desk and/or terminal, the image data representing the purchase offer, e.g. an optically readable code which contents represents the purchase offer, is displayed on the screen of the mobile device 105 and is then shown to a staff member 180 at the cash register desk 140 or is scanned or read by a scanner 181 or an image acquisition device 182, e.g. a mobile communication device, operated by the staff member 180 at the desk 140 or a scanner 151 or an image acquisition device 152 operated by the customer at the self-checkout terminal 141. Thus, the scanning or reading may performed by using a device (151, 152, 181, 182) operatively coupled to or communicatively connected to the cashier system of the store 101, thereby validating or verifying that the user of the mobile device 105 is authorized to take advantage of the purchase offer comprising at least one item of the first product 110 and at least one item of the second product 111. The scanning or reading of the displayed optically readable code may automatically also initiate a payment transaction for purchasing the at least one product item according to the price and conditions of the purchase offer provided to the customer's mobile device.

The optically readable code displayed on the screen/display of the mobile device 105 in response to receiving the event data indicating the event of acceptance by the customer of a purchase offer may also be scanned or read by a scanner or image acquisition or recognition device (151, 161) at a self-checkout desk 141 in the store 101 and/or at the exit gate area or desk 160 of the store 101, to thereby open an exit gate 162. The optically readable code, when scanned or read by a scanner or image acquisition or recognition device (151, 161) at the self-checkout area or desk 141 in the store 101 and/or at the exit gate area or desk 160 of the store 101, may then deactivate an alarm tag attached to the first physical product item 110 and/or automatically open the exit gate 162 in response to the scanning or reading of the optically readable code.

In embodiments, the mobile device 105 and the control system 130 may communicate with each other (as well as other devices and data sources) via a network 125. The network communication may take place via any media such as standard and/or cellular telephone lines, LAN or WAN links, broadband connections (ISDN, Frame Relay, ATM), wireless links, and so on. Preferably, the network 125 can carry TCP/IP protocol communications, and HTTP/HTTPS requests made by the mobile device and the connection between the mobile device 105 and the control system 130 can be communicated over such networks. In some implementations, the network includes various cellular data networks such as 2G, 3G, 4G, 5G and others. The type of network is not limited, however, and any suitable network may be used. Typical examples of networks that can serve as the communications network 125 include a wireless or wired Ethernet-based intranet, a local or wide-area network (LAN or WAN), and/or the global communications network known as the Internet, which may accommodate many different communications media and protocols.

The control system 130 may include various functional components, including, for example, a client database 131, a communications server 133 with Application Programming Interfaces (APIs) for interacting with the application program running on the mobile device 105, and an application server 134. In various implementations of the system according to the technology disclosed, the control system may also comprise a purchase server 132, which comprises the communications server 133 and the application server 134. In other implementations of the system according to the technology disclosed, at least the communication server 134 may be replaced by a microservices computer architecture with APIs for interacting with the application program running on the mobile device 105. The communication server 134, or the microservices computer architecture, provides the conduit through which requests for data and processing are received from the mobile device 105, as well as interaction with other servers that may provide additional product information such as product descriptions, inventory levels, pricing details. The communication server 134 may also transmit product and/or offer information to the mobile device 105 via the network 125. The application server 134 stores and executes the primary programming instructions for facilitating the functions executed on the purchase server 132. Data describing the product(s) and historical event data related to the user, the store, and/or the product may be stored in a client database 131 for use by the application server 134.

As the user shops, she can use the application program on the mobile device 105 to receive purchase offers and request information about product(s) she may considering purchasing. For example, she may scan the barcode symbol 121 on the barcode label 120 attached to the product 110 as well as receive pricing, warranty, delivery options, reliability or other information about the product that may influence her decision to purchase the product 110. She may use information about the product 110 to search other stores pricing, inventory or other sales parameters using a search application, either separate from the application program or embedded within the application program. She may confirm the purchase, or, in some cases, decide not to purchase the product and place the product back on the shelf.

The user may enter credit card information and authorization into a user interface of the mobile device 105, and the mobile device 105 may transmit the credit card information and authorization to the purchase server 132 of the control system to initiate a purchase of product 110. In some embodiments, purchase server 130 may also be in communication with an offer server (not shown), in which various offers from manufacturers and/or retailers may be stored in association with products (110, 111) offered for sale by the store 101.

Figure 2:
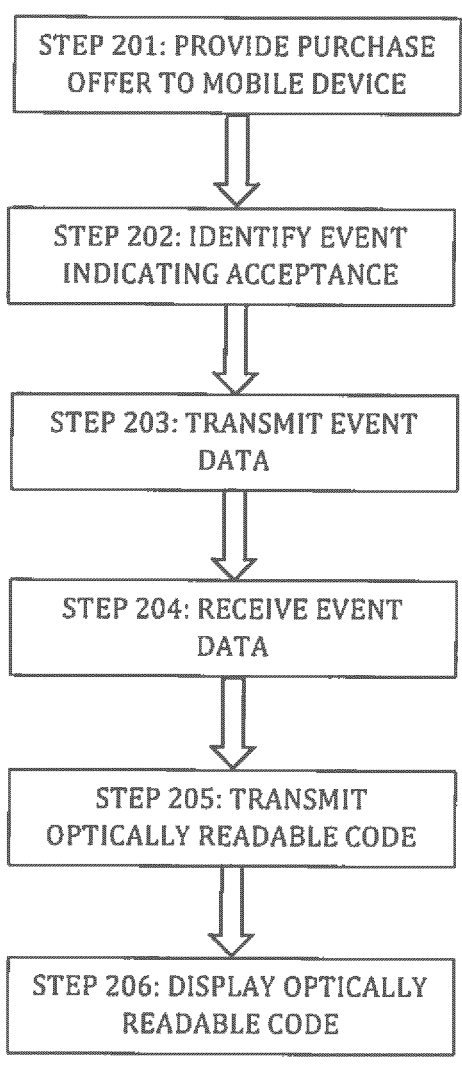
FIG. 2 is a flowchart illustrating a process according to embodiments of the technology disclosed.

FIG. 2 is a flowchart illustrating a process according to certain embodiments of the technology disclosed, comprising the following steps:

a. provide purchase offer to mobile device (STEP 201);

b. identify, by mobile device, at least one event indicating acceptance of purchase offer (STEP 202);

c. transmit, by mobile device, event data representing the acceptance (STEP 203);

d. receive, by control system, event data representing the acceptance (STEP 204);

e. transmit, by control system, data for generating and/or displaying an optically readable verification code (STEP 205);

f. display, by mobile device, the optically readable verification code (STEP 206).

Figure 3:
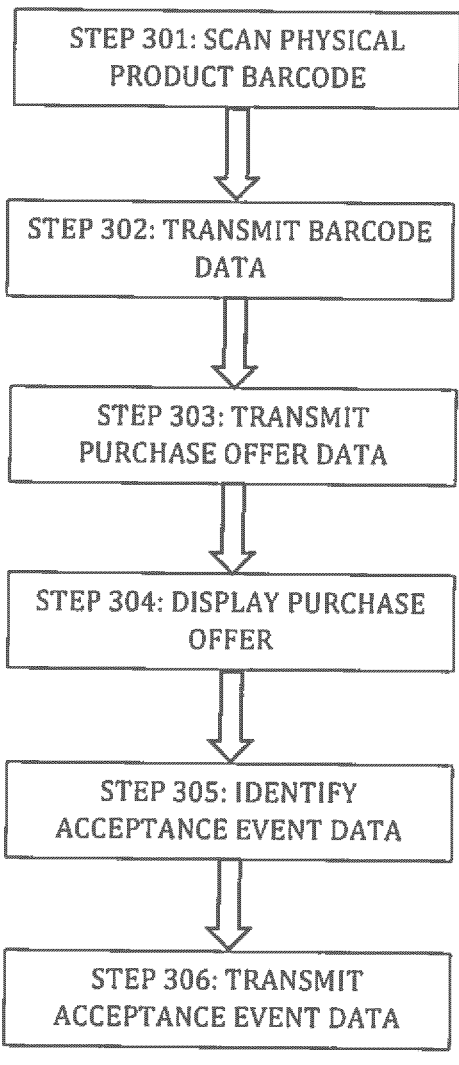
FIG. 3 is a flowchart illustrating a process according to embodiments of the technology disclosed.

FIG. 3 is a flowchart illustrating a process according to certain embodiments of the technology disclosed, comprising the following steps:

a. scan a barcode associated with a physical product (STEP 301);

b. transmit data representing barcode (STEP 302);

c. transmit data representing the purchase offer (STEP 303);

d. display data representing the purchase offer (STEP 304);

e. identify event indicating the event of accepting the purchase offer (STEP 305);

f. transmit event data representing the event indicating the acceptance of the purchase offer (STEP 306).

Figure 4:
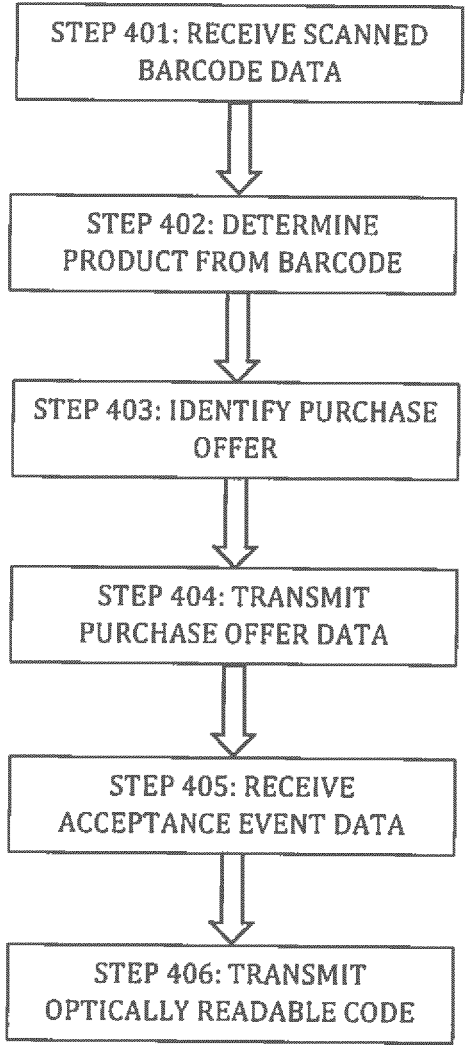
FIG. 4 is a flowchart illustrating a process according to embodiments of the technology disclosed.

FIG. 4 is a flowchart illustrating a process according to certain embodiments of the technology disclosed where a control system is performing the following steps:

a. receive scanned barcode data (STEP 401);

b. determine product associated with barcode (STEP 402);

c. identify purchase offer associated with identified product (STEP 403);

d. transmit data representing a purchase offer (STEP 404);

e. receive event data indicating acceptance of purchase offer (STEP 405); and f. transmit data for displaying an optically readable verification code (STEP 406).

Figure 5:
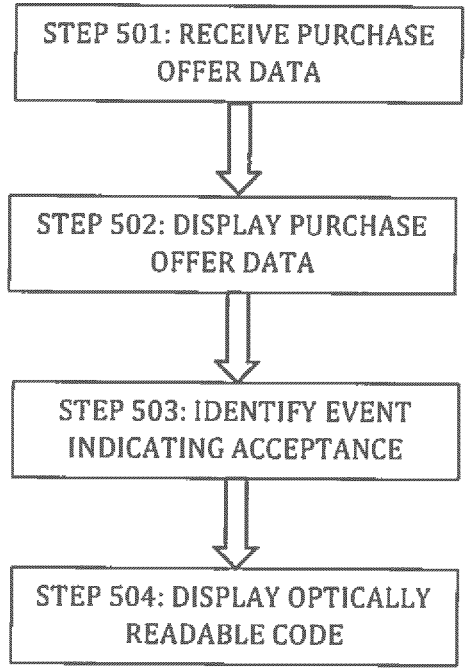
FIG. 5 is a flowchart illustrating a process according to embodiments of the technology disclosed.

FIG. 5 is a flowchart illustrating a process according to certain embodiments of the technology disclosed where an application program is performing the following steps:

a. receive data representing a purchase offer (STEP 501);

b. display data representing the purchase offer (STEP 502);

c. identify the event indicating acceptance of the purchase offer (STEP 503); and d. display the optically readable verification code (STEP 504).

A user interested in learning more about a product or considering purchasing the product uses initiates an application on her mobile device 105 which provides barcode and scanning functionality. The user scans the image, and the mobile app transmits the image data to the control system 130. The control system 130 processes the image received from mobile device 105 using an image recognition technique to identify the product associated with the transmitted image.

Once the product has been identified, the purchase offer associated with the product may be retrieved by a computer unit of the control system, for example, from a client database either stored on a purchase server or a separate data store and transmitted to the mobile device 105 where it is displayed to the user. The purchase offer may be displayed as an image, as a textual message, or a combination of the two.

In certain embodiments of the technology disclosed and after having seen the product information, the user may then determine whether to add the product to the electronic shopping basket of the application program or not. In embodiments of the technology disclosed, and if the user decides to accept the purchase offer including the product, the user can confirm this acceptance by, for example, adding a product item belonging to a second product of the purchase offer to the electronic shopping basket, by adding all of the product items of the purchase offer to the electronic shopping basket, by checking out the product items of the purchase offer to proceed to payment, e.g. by selecting a button or menu option, actively requesting for an optically readable verification code by selecting a button or menu option, entering payment instructions (e.g., using PayPal, a credit or debit card, etc.) and/or providing other information related to the purchase. Once entered, event data representing the at least one event indicating the acceptance of the user is transmitted to the control system where it is processed.

In embodiments, the provided purchase offer, including at least one item of the first product, which associated barcode was scanned before receiving the purchase, and at least one item of a second product different from the first product, where the combined purchase offer is at least partly based on previously received event data, i.e. received before the customer entered the store. The combined offer, including both the first product which physical product item's associated barcode label was scanned or read by the mobile device and the second product may then be created/constructed, e.g. dynamically created/constructed, at least partly based on identified and/or received events and/or event data obtained before the customer entered the store, where the events and/or event data was identified by and/or received from at least one of the customer's own mobile device and the mobile devices of other customers. The previously identified and/or received events and/or event data may then be associated with previously performed purchases of items of the first product and of the second product, e.g. combined or aggregated purchases including at least one item of the first product and at least one item of the second product.

In aspects, the system, methods adapted for validly and computer program products of the technology disclosed are adapted for securely validating or verifying, to the staff member at the store and/or the cashier system of the store before payment, that a customer, or user of a mobile device, can take advantage of a purchase offer, e.g. a customized or personalized purchase offer, provided to the customer in response to identified events associated with the customer's mobile device and while the customer is present in the store.

In embodiments, the technology disclosed is directed to validating or verifying that a customer is authorized to take advantage of a purchase offer by providing a scannable and/or readable verification code, and more particularly to method and a system for capturing and acting on event data to provide secure verification of the customer's authorization to take advantage of the purchase offer by providing the scannable and/or readable verification code in response to events identified by the application program running on the mobile device. In embodiments and after receiving an optically readable code which contents at least partly represents the purchase offer, the customer typically needs to fetch the at least one physical product item of the purchase offer and bring the at least one physical item to the cash register desk or and/or a self-checkout terminal. At the desk and/or terminal, the image data representing the purchase offer, e.g. the optically readable code which contents represents the purchase offer, is displayed on the screen of the mobile device and is then shown to a staff member at the cash register desk or is scanned or read by a device. At the desk and/or terminal, the image data representing the purchase offer, e.g. an optically readable code which content represents the purchase offer, is displayed on the screen of the mobile device and may then be scanned or read by a device operated by a staff member at the desk or a device operated by the customer at the self-checkout terminal, e.g. a scanner. Thus, the scanning or reading may be performed by using a device communicatively connected to the cashier system of the store, thereby validating or verifying that the user of the mobile device is authorized to take advantage of the purchase offer comprising the at least one physical product item brought to the cash register desk or and/or a self-checkout terminal.

In embodiments, the technology disclosed relates to a system, methods and computer program products for capturing and acting in response to a sequence of events or subsequently received event data, e.g. automatically and in real-time, in order to display data representing a purchase offer on the screen of the customer's mobile device. The displayed purchase offer may then include the purchase of both a first product which physical product item associated barcode was scanned or read in the store by the mobile device receiving the purchase offer and the purchase of an product item of at least one second product which associated barcode the mobile device was not scanned or read before receiving the purchase offer. After first receiving and then accepting the purchase offer, the customer typically needs to fetch at least one physical item of the second product and bring the at least one physical item of the first product and the at least one physical item of the second product to the cash register desk or and/or a self-checkout terminal where the image data representing the purchase offer is shown or scanned/read by a device to validate or verify that the user of the mobile device is authorized to take advantage of the purchase offer, e.g. a customized or personalized purchase offer which is based on previously obtained event data. In certain embodiments of the methods, systems and computer program products of the technology disclosed, the scanning or reading of the displayed optically readable code may automatically initiate a payment transaction for purchasing the at least one item of the first product and the at least one item of the second product according to the price and conditions of the purchase offer provided to the customer's mobile device, e.g. by automatically providing, by the controls system, the payment credentials of the customer in response to the scanning or reading of the optically readable code.

In embodiments, the technology disclosed is directed to validating or verifying that a customer is authorized to take advantage of a purchase offer by providing a scannable and/or readable verification code, and more particularly to method and a system for capturing and acting on event data to provide secure verification of the customer's authorization to take advantage of the purchase offer by providing the scannable and/or readable verification code in response to events identified by the application program running on the mobile device. In embodiments and after receiving an optically readable code which contents at least partly represents the purchase offer, the customer typically needs to fetch the at least one physical product item of the purchase offer and bring the at least one physical item to the cash register desk or and/or a self-checkout terminal. At the desk and/or terminal, the image data representing the purchase offer, e.g. the optically readable code which contents represents the purchase offer, is displayed on the screen of the mobile device and is then shown to a staff member at the cash register desk or is scanned or read by a device. The scanning or reading may performed by using a device communicatively connected to the cashier system of the store, thereby validating or verifying that the user of the mobile device is authorized to take advantage of the purchase offer comprising the at least one physical product item brought to the cash register desk or and/or a self-checkout terminal.

In certain aspects of the technology disclosed, event data resulting from a consumer's behavior at a retail establishment is captured using a mobile device and a backend system, where the backend system, or control system, may comprise a client database, a purchase server and/or an offer server. An image identifying a first product being offered for sale by a retail establishment is obtained via an image acquisition component operatively connected to the mobile device. In embodiments, the image, or data representing the image of the first product, is transmitted from the mobile device to the backend system, and product information, e.g. including price and description information, may be received in response. The product information may then be presented in a mobile application program running on the mobile device and displayed on a display or screen of the mobile device.

In other aspects, the technology disclosed relates to the acquisition of an image identifying a first product and in response to event data representing the event of acquiring the image and/or a subsequent event of adding an item of the first product to the shopping basket in the mobile application program running on the mobile device, the consumer is provided with product information and/or a purchase offer from a backend system, where the purchase offers includes at least a second product different from the first product associated with the acquired image.

In embodiments, the technology disclosed relates to a backend/control system configured to transmit data adapted for generating and/or displaying an optically readable code in the application program and on the screen of a mobile device, where the data is transmitted in response to the backend/control system receiving event data, from the same mobile device, representing the event of accepting, by the user of the mobile device, a purchase offer previously provided to the mobile device. The displayed optically readable code, when scanned or read, may then be adapted and used for validating or verifying to the cashier system of the retail store or to the staff in the retail store, that the user can, or is authorized to, take advantage of the purchase offer and proceed to payment. The optically readable code may then be representing the purchase offer or reflecting the items currently in the shopping basket which includes the product items of the purchase offer. Following the scanning or reading of the optically readable/scannable code in the retail store to validate or verify that the user of the mobile device/customer is authorized to take advantage of the purchase offer, the customer may proceed to payment by conducting a purchase transaction in the store including at least the purchase of the product items according to the price, terms and/or conditions of the purchase offer. The purchase transaction may then be conducted by a staff member using the cashier system of the store or by the user of the mobile at a self-checkout terminal in the store. The scanner, or image acquisition device, used for scanning or reading the optically readable code to thereby validate or verify that the user of the mobile device/customer is authorized to take advantage of the purchase offer may then be communicatively connected to and/or operatively coupled to the self-checkout terminal and the cashier system of the store.

In embodiments, the method, the self-checkout terminal and the cashier system of the technology disclosed further comprises the step of automatically conducting a payment transaction which includes the payment of the product items of said purchase offer in response to scanning or reading, e.g. by a scanner or image acquisition device of the self-checkout terminal which is operatively coupled to the cashier system of the store, the optically readable code displayed on the screen of the mobile device. In embodiments, the optically readable code also includes optically readable code representing the payment credentials of a customer associated with the mobile device. In certain embodiments, the payment credentials of a customer associated with the mobile device, when scanned or read, is used for performing said step of automatically conducting a payment transaction including the payment of the product items of said purchase offer in response to scanning or reading said optically readable code.

In embodiments, the technology disclosed relates to a backend system, e.g. a control system, configured to transmit data adapted for generating and/or displaying an optically readable code in response to the backend/control system receiving, from the mobile device, event data representing the event of actively requesting, by the user of the mobile device activating some input means of the mobile device, the optically readable code representing, including or corresponding to the purchase offer to be displayed in the application program and on the screen of the mobile device. The products items corresponding to the purchase offer may then have been previously added to the electronic shopping basket/cart of the application program.

In embodiments, the technology disclosed relates to a backend system, e.g. a control system, configured to transmit data adapted for generating and/or displaying an optically readable code in response to the backend/control system receiving, from the mobile device, event data representing the event of accepting the purchase offer by activating/pressing at least one button, object, symbol, link or area in the application program, e.g. the electronic shopping basket/cart, where the at least one button, object, symbol, link or area is associated with products items corresponding to the purchase offer. The products items corresponding to the purchase offer may then have been previously added to the electronic shopping basket/cart of the application program.

In embodiments, the technology disclosed relates to a backend system, e.g. a control system, configured to transmit data adapted for generating and/or displaying an optically readable code in response to the backend/control system receiving, from the mobile device, event data representing the event of accepting the purchase offer by actively checking-out, in the application program running on the mobile device, product items corresponding to the purchase offer. The step of checking-out the items in the application program may then involve the action, by the user of the mobile device, of pressing at least one button, object, link or area in the application program to check-out items corresponding to the purchase offer.

In embodiments, the technology disclosed relates to a backend system, e.g. a control system, configured to transmit data adapted for generating and/or displaying an optically readable code in response to the backend/control system receiving, from the mobile device, event data representing the event of accepting the purchase offer by checking-out, in the application program running on the mobile device, product items corresponds to the purchase offer.

In embodiments, the technology disclosed relates to a backend system, e.g. a control system, configured to transmit data adapted for generating and/or displaying an optically readable code in response to the backend/control system receiving event data, from the mobile device, representing the event of adding items corresponding to the product items of the purchase offer to the electronic shopping basket/cart of the application program running on the mobile device.

In embodiments, the event data received by the backend/control system and which triggers the transmission of data for generating and/or displaying an optically readable code may represent an identified second event of adding the products of the purchase offer, or at least an item of a second product or second product category, to the electronic shopping basket of the application program following an identified first event of acquiring an image, e.g. scanning a barcode, associated with and identifying a first physical product item belonging to a first product or first product category different from the second product or second product category.

In embodiments, the event data received by the backend/control system and which triggers the transmission of data for generating and/or displaying an optically readable/scannable code may represent at least one of the second event of adding the products of the purchase offer or at least an item of a second product to the electronic shopping basket of the application program following a first event of acquiring an image, e.g. scanning a barcode, associated with a first physical product item belonging to a first product or first product category different from the second product or second product category.

Embodiments of the technology disclosed are directed to a system, a backend/control system, an application program installed on a mobile device and methods for providing, by the backend/control system, a purchase offer and then validating or verifying, by the application program, the acceptance of a purchase offer by the user of the mobile device in response to event data identified by the application program and representing occurred events and/or actions performed by the user of the mobile device (customer) while the user/customer is present in the store.

In embodiments, the technology disclosed relates to an application program installed on a mobile device and which is configured to generate and/or display an optically readable code in the application program and on the screen of a mobile device in response to the application program is identifying the event of accepting, by the user of the mobile device, a purchase offer previously provided to the mobile device from a backend/control system. The displayed optically readable code, when scanned or read, may then be adapted and used for validating or verifying to the cashier system of the retail store or to the staff in the retail store, that the user can, or is authorized to, take advantage of the purchase offer and proceed to payment. The optically readable code may then be representing the purchase offer or reflecting the items currently in the shopping basket which includes the product items of the purchase offer. In embodiments, the event of accepting the purchase offer identified by the application program includes actively checking-out, in the application program running on the mobile device, product items corresponding to the purchase offer. The step of checking-out the items in the application program may then involve the action, performed by the user of the mobile device, of pressing at least one button, object, link or area in the application program to check-out items corresponding to the purchase offer.

In embodiments, the technology disclosed relates to a an application program installed on a mobile device configured to generate and/or display an optically readable code in response to identifying the activation of input means of the mobile device, the optically readable code representing, including or corresponding to the purchase offer to be displayed in the application program and on the screen of the mobile device. The products items corresponding to the purchase offer may then have been previously added to the electronic shopping basket/cart of the application program. The optically readable code may then be adapted for validating or verifying, when scanned by a scanner or read by the staff or image acquisitions means of the store, that the user of the mobile device is authorized to take advantage of the purchase offer provided to him/her. Following the verification by using the scanner of the cashier system or the device of a staff member in the store that the user of the mobile device/customer is authorized to take advantage of the purchase offer, the customer may proceed to payment by conducting a purchase transaction in the store including at least the purchase of the product items according to the price, terms and/or conditions of the purchase offer. The purchase transaction may then be conducted by a staff member using the cashier system of the store or by the user of the mobile at a self-checkout terminal in the store. The scanner, or image acquisition device, used for scanning or reading the optically readable code to thereby validate or verify that the user of the mobile device/customer is authorized to take advantage of the purchase offer may then be communicatively connected to and/or operatively coupled to the self-checkout terminal and the cashier system of the store.

According to certain embodiments, an event in the retail establishment representing a decision by the consumer to proceed with purchasing the first product is identified, and the event data/information representing the event is transmitted from the mobile device to the backend system, e.g. a purchase server. In response to receiving event data/information representing the decision by the customer, i.e. the user of the mobile device, to proceed with purchasing the first product, the backend system may in real-time initiate the display/presentation of a subsequent offer for sale including also a second product in a mobile application program running on the mobile device to thereby display the subsequent offer for sale on the display of the mobile device in that the user of the mobile device is provided with an option to accept or reject the subsequent offer for sale, e.g. by at least one of adding the subsequent offer for sale, or at least one item of a second product included in the subsequent offer for sale, to the shopping basket of the mobile application program or by checking-out the subsequent offer for sale or an item of the second product, e.g. by pressing a check-out button associated with the subsequent offer for sale or second product.

The image identifying the product can be any one or more of a number of images, such as a bar code, an image of the product, an image of all or a portion of product packaging, a product name, brand name, and a product number. The product information can be displayed on the mobile device as image, text, or both.

In aspects, the technology disclosed is directed to a system, a backend/control system, an application program installed on a mobile device, and methods for providing a purchase offer in real-time to a user of a mobile device in response to events identified by the application program running on the mobile device and which are performed by the user of the mobile device while the user is present in the store.

In aspects, the technology disclosed is directed to a system, a backend/control system, an application program installed on a mobile device, a store and methods for providing a purchase offer in real-time to a user of a mobile device in response to events identified by the application program running on the mobile device and then display an optically readable/scannable code on the screen of the mobile device in response to at least one further event identified by the application program, where the optically readable code, e.g. a QR-code, is adapted to be used for validating or verifying that the user of the mobile device is authorized to take advantage of the purchase offer and may proceed to payment.

In embodiments, the method and cashier system of the technology disclosed further comprises the step of automatically conducting a payment transaction which includes the payment of the product items of said purchase offer in response to scanning or reading, e.g. by a scanner or image acquisition device operatively coupled to the cashier system of the store, the optically readable/scannable code displayed on the screen of the mobile device.

In embodiments, the optically readable code also includes payment credentials of a customer associated with the mobile device, e.g. the optically readable/scannable code displayed also includes optically readable code representing. In certain embodiments, the payment credentials of a customer associated with the mobile device, when scanned or read, is used for performing said step of automatically conducting a payment transaction including the payment of the product items of said purchase offer in response to scanning or reading said optically readable code.

In aspects, the technology disclosed is directed to a system, a backend/control system, an application program installed on a mobile device, a store and methods for providing a purchase offer in real-time to a user of a mobile device in response to the event of acquiring an image of a physical product in the store and then display an optically readable code on the screen of the mobile device in response to further event(s) identified by the application program, where the optically readable code, e.g. a QR-code, is adapted to be used for validating or verifying that the user of the mobile device is authorized to take advantage of the purchase offer and therefore may proceed to payment. In embodiments, the method and cashier system of the technology disclosed may then further comprise the step of automatically conducting a payment transaction which includes the payment of the product items of said purchase offer in response to scanning or reading, e.g. by a scanner or image acquisition device operatively coupled to the cashier system of the store, the optically readable code displayed on the screen of the mobile device. In embodiments, the optically readable code may then also include payment credentials of a customer associated with the mobile device. In certain embodiments, the payment credentials of a customer associated with the mobile device, when scanned or read, is used for performing said step of automatically conducting a payment transaction including the payment of the product items of said purchase offer in response to scanning or reading said optically readable code.

In embodiments, the technology disclosed relates to a system, a backend/control system, an application program installed on a mobile device and methods for providing a purchase offer, including a second product or second product category, to a user of a mobile device (customer) in response to obtaining event data representing an occurred event, or action performed by the user of the mobile device, associated with a first product or first product category, where the event/action is identified by the application program running on the mobile device, and where the step of providing the purchase offer to the mobile device is preceded by the step of obtaining, via image acquisition component of the mobile device, an image or scanned barcode associated with a physical product item belonging to a first product or first product category different from the second product or second product category. In different embodiments, the image acquisition component may be any device component capable of capturing an image of information identifying a product. Such information may include, for example, an image of a bar code (e.g., universal product code (UPC), a matrix barcode (QR code), three-dimensional barcode, or European Article Number (EAN)) on a label affixed to product, an image of product itself, an image of all or a portion of the packaging of product, or any other image that includes information identifying the product.

In embodiments, the purchase offer includes both a first product item, belonging to a first product, which associated barcode is first scanned by the customer and the second product which is not scanned by the customer, or user of the mobile device.

In embodiments, the technology disclosed relates to method, a system and control system for identifying an event, as well as transmitting and obtaining event data, representing a decision by the consumer not to purchase a product. The event representing a decision by the consumer not to purchase the product can include, but is not limited to, the consumer entering or exiting the retail establishment, a determination of the consumer's location, the scanning of a product-identifying image by the consumer, the time that such scanning occurs, the addition or removal of an item to a shopping cart, and the time elapsed since the occurrence of a previous event.

In some embodiments, one or more of a survey, an invitation to a sale, and an offer for a subsequent purchase may be received at the mobile device in response to transmitting the event information to the purchase server.

In further embodiments, an event in the retail establishment representing a decision by the consumer to accept the purchase offer is identified, and event data/information is transmitted from the mobile device to the control system.

In yet another aspect, the technology disclosed relates to a system for capturing event data resulting from a consumer's behavior at a store or retail establishment. The system comprises a mobile device having at least one processor configured to obtain an image identifying a product via an image acquisition component and transmit the image to a control system, e.g. a purchase server of the control system. The processor may be further configured to receive product information for the product, including price and description information, identify an event in the store representing a decision by the consumer not to purchase the product, and transmit the event data/information to the purchase server. The processor may be further configured to receive a purchase offer including the purchase of at least the identified product, including price and description information, and identify an event representing a decision by the consumer to accept the purchase offer, and then transmit the event data/information to the control system.

The image identifying the product can be any one or more of a number of images, such as a barcode, an image of the product, an image of all or a portion of product packaging, a product name, brand name, and a product number. The product information can be displayed on the mobile device as image, text, or both.

The event representing a decision by the consumer to accept the purchase offer can include, but is not limited to, the scanning of a product-identifying image of a second physical product item belonging to a second product of the purchase offer by the consumer, the time that such scanning occurs, the addition of a product item belonging to a second product of the purchase offer to a shopping cart, the pressing of a button, link, area or object in the application program, activating an input means of the mobile device, and the time elapsed since the occurrence of a previous event such as the time elapsed since the scanning of a product-identifying image of the first physical product item belonging to a first product.

In some embodiments, the processor of the mobile device may be further configured to receive, in response to transmitting different types of event data/information, one or more of a survey, a coupon, an invitation to a sale, and an offer for a subsequent purchase not including a product item belonging to the same first product or product category as the first physical product item which initially was identified by the product-identifying image.

In another aspect, a system for capturing event data resulting from a consumer's behavior at a store or retail establishment comprises a mobile device having at least one processor configured to obtain an image identifying a product via an image acquisition component, and transmit the image to a control system such as a purchase server. The processor is further configured to receive product information for the product, including price and description information, as well as receive instructions to search for additional product information related to the product, compare the product information and the additional product information, and update the product information based on the comparison. In different embodiments, the image acquisition component may be any device component capable of capturing an image of information identifying a product. Such information may include, for example, an image of a bar code (e.g., universal product code (UPC), a matrix barcode (QR code), three-dimensional barcode, or European Article Number (EAN)) on a label affixed to product, an image of product itself, an image of all or a portion of the packaging of product, or any other image that includes information identifying the product.

In another aspect, an article of manufacture having computer-readable program portions embodied thereon for capturing event data resulting from a consumer's use of a mobile device at the store comprises computer-readable instructions for obtaining, via an image acquisition component operatively connected to a mobile device, an image comprising information that identifies a product being offered for sale by a retail establishment. The article further comprises computer-readable instructions for transmitting the image from the mobile device to a control system, receiving at the mobile device, in response, product information comprising description and price information for the product, displaying the product information on a display of the mobile device, identifying an event in the application program running on the mobile device representing a decision by the consumer to purchase the product, and transmitting the event information from the mobile device to the control system. In different embodiments, the image acquisition component may be any device component capable of capturing an image of information identifying a product. Such information may include, for example, an image of a barcode (e.g., universal product code (UPC), a matrix barcode (QR code), three-dimensional barcode, or European Article Number (EAN)) on a label affixed to product, an image of product itself, an image of all or a portion of the packaging of product, or any other image that includes information identifying the product.

In yet another aspect, an article of manufacture having computer-readable program portions embodied thereon for capturing event data resulting from a consumer's use of a mobile device at a retail establishment comprises computer-readable instructions for obtaining, via an image acquisition component operatively connected to a mobile device, an image comprising information that identifies a product being offered for sale by a retail store. The article further comprises computer-readable instructions for transmitting the image from the mobile device to a purchase server, receiving at the mobile device, in response, a purchase offer comprising description and price information for the product, receiving at the mobile device instructions to request for verification that the customer is authorized to take advantage of the purchase offer on a display of the mobile device, and requesting an optically readable code by selecting a button or menu option, e.g. pressing a button, link or area in the application program running on the mobile device or by activating input means of the mobile device.

In certain aspects, the technology disclosed relates to a system, method and mobile device for presenting a combined offer including a first product and a second product different from the first product, where a barcode associated with a physical product item of the first product was scanned by the user of a mobile device in the retail store and where the second product is added to the electronic basket of the mobile application program running on the mobile device without any need for the user to first scan a barcode associated with a physical product item of the second product. According to embodiments, first event information is transmitted from the mobile device following the event of scanning the barcode associated with a physical product item of a first product and, in response to receiving the first event data/information from the mobile device, a backend system of the system transmits a purchase offer including the purchase of at least one item of the first product and at least one item of the second product.

In certain aspects, the technology disclosed relates to a system, a backend system, a method and a mobile device for presenting, on the screen of the mobile device, an optically readable code representing the acceptance by the user of the mobile device of a combined offer including a first product and a second product different from the first product, where a separate barcode associated with a physical product item of the first product was first scanned by the user of the mobile device in the retail store, and where both the first product and the second product is added to the electronic basket of the mobile application program running on the mobile device without any need for the user to scan a barcode associated with a physical product item of the second product prior to adding the second product to the electronic basket and accepting the combined offer.

In certain aspects, the technology disclosed relates to a system, a backend system, a method and a mobile device for presenting/displaying, on the screen of the mobile device, an optically readable code, where the presented/displayed optically readable code is adapted to indicate to a staff member scanning the optically readable code with a scanner in the store that the user of the mobile device has accepted a combined offer provided by the backend system and which includes the purchase of both a first product and a second product different from the first product. The generation and display of the optically readable code is preceded by the transmission of first event information from the mobile device to indicate to the backend system the occurrence of a first event of scanning a separate barcode associated with a physical product item of the first product and is further triggered by the receipt of second event information by the backend system which is transmitted by the mobile device in response to a second event of adding the second product to the electronic basket and/or the action of checking-out of the combined offer in the mobile application program running on the mobile device, e.g. by selecting a button or menu option such as pressing at least one check-out button.

According to certain embodiments of the technology disclosed, there is no need for the user to scan a barcode associated with a physical product item of the second product to accept the combined offer, e.g. there is no need to scan a barcode associated with the second product prior to adding the second product or the combined offer to the electronic basket and/or prior to confirming the combined offer by checking-out of the second product and/or combined offer in the mobile application program. The event of checking-out of the second product and/or checking-out the combined offer may be performed by pressing at least one check-out button in the mobile application program running on the mobile device.

In certain embodiments, the technology disclosed relates to a backend system configured to transmit data defining and representing an offer for sale, where said transmission of said offer for sale is preceded by said backend system receiving a barcode or first event data representing the event of scanning, by a mobile device, a barcode associated with a first product or product category. The offer for sale may then include a first product or product category and, in addition, a second product or product category for which no barcode associated with it typically was scanned by the mobile device prior to creating/constructing said offer for sale by the backend system.

Data or information defining and representing said offer for sale which preferably is only available for said mobile device, is transmitted, from said backend system to said mobile device which scanned the barcode associated with said first product or product category. The data or information defining and representing the offer for sale is transmitted, e.g. automatically transmitted, in response to the backend system receiving second event data from the mobile device, where the second event data is indicating at least one of the occurred event of adding said offer for sale or said second product or product category to the electronic shopping basket of a mobile application program running on said mobile device, the event of adding the second product or product category to the electronic shopping basket, and the event of activating a check-out functionality, e.g. by pressing a check-out button, in the mobile application program running on the mobile device. The check-out functionality may be used as indicator that the user of the mobile device wants to proceed to payment in accordance with the offer for sale and/or proceed to payment of at least one item of the first product or product category and at least one item of the second product or product category. In embodiments, the above-mentioned offer for sale was created/constructed, e.g. dynamically created/constructed, by the backend system based on at least one of obtained first, second and third event data associated with the first and second product and which were previously received by the backend system from other mobile devices/customer and obtained first, second and third event data previously received from the mobile device. The third event data is event data transmitted from a mobile device and received by the backend system following a confirmed payment transaction of a product or product category.

In certain embodiments, the technology disclosed relates to a backend system configured to, following the scanning of a barcode associated with an item of a first product or product category and in response to a first event identified by a mobile device, transmit data or information to a mobile device, where the data or information is defining and/or representing an offer to purchase at least one item of the first product or product category and at least one item of a second product or product category different from the first product, where the identified first event includes at least one of adding items of the first product or product category to the shopping basket in the mobile application program running on the mobile device and conducting check-out of at least one item of the first product or product category for payment.

In certain embodiments, the technology disclosed relates to a mobile device comprising a mobile application program and processor configured to, following the scanning of a barcode associated with an item of a first product or product category and in response to an event identified by the mobile device, generate and present an optically readable code, where the optically readable code is indicating to reader that the user of the mobile device is authorized to take advantage of an offer to purchase at least one item of the first product and at least one item of a second product different from the first product, and where the event is at least one of the events of scanning a barcode associated with an item of a second product, adding items according to the offer to purchase to the shopping basket in the mobile application program, adding at least one item of the second product to the shopping basket in the mobile application program and checking-out at least one item of the second product and/or items according to the offer to purchase at least one item of the first product and at least one item of the second product.

In another aspects, event data resulting from a consumer's behavior at a retail establishment is captured using a mobile device and a backend system such as a control system comprising a client database and a purchase server. An image identifying a product being offered for sale by a retail establishment is obtained via an image acquisition component operatively connected to the mobile device. The image is transmitted from the mobile device to the purchase server, and product information including price and description information is received in response.

The present invention generally relates to systems, methods and computer program products for providing in-store product information and offers. An exemplary control system, or backend system, is configured to receive event data from a consumer's mobile device that indicates the consumer's interest in purchasing products available at a store and provide product information and/or purchase offers based on obtained event data.

In embodiments and in response to an event identified by an application program running on the customer's mobile device, an optically readable code is displayed on the customer's mobile device, where the optically readable code is adapted to be used for validating or verifying that the customer is authorized to take advantage of the purchase offer.

In other embodiments, the optically readable code is displayed following the acquisition of an image identifying a first product and in response to event data representing the event of acquiring the image and/or a subsequent event of adding an item of the first product to the electronic shopping basket or activating an input means in the mobile application program running on the mobile device. In response to receiving the acquired image, the consumer is provided with a purchase offer from the control system, where the purchase offer includes at least a second product different from the first product associated with the acquired image.

In aspects, the technology disclosed relates to systems, methods and computer program products for providing in-store product information and offers. An exemplary system is configured to receive event data from a consumer's mobile device that indicates the consumer's interest in purchasing a product available at a store and provide product information and purchase offers based on obtained event data.

In certain aspects, the technology disclosed relates to systems, methods and computer program products for generating and/or displaying an optically readable code for validating or verifying that the user of a mobile device is authorized to take advantage of a purchase offer provided to the customer's mobile device by a backend system. An exemplary system is configured to receive event data from a consumer's mobile device that indicates the consumer's acceptance of the purchase offer including a product available at the store and, in response to receiving the event data, generating and/or displaying an optically readable code on the screen of the mobile device.

In certain aspects, the technology disclosed relates to systems, methods and computer program products for generating and/or displaying an optically readable code for validating or verifying that the user of a mobile device is authorized to take advantage of a purchase offer provided to the customer's mobile device by a backend system. An exemplary system is configured to receive event data from a consumer's mobile device that indicates the consumer's acceptance of the purchase offer including a first and a second product available at the store, in response to receiving the event data, generating and/or displaying an optically readable code on the screen of the mobile device, where the generating and/or displaying an optically readable code is preceded by the scanning/reading of a barcode associated with the first product.

In embodiments, the acquisition of an image identifying a first product and in response to event data representing the event of acquiring the image and/or a subsequent event of adding an item of the first product to the shopping basket in the mobile application program running on the mobile device, the consumer is sent product information and/or a purchase offer from a backend system, where the purchase offers includes a second product different from the first product associated with the acquired image.

The user of the mobile device may then accept the offer by adding the products of the provided offer or an item of the second product to the shopping basket and/or by checking-out the products of the provided purchase offer or an item of the second product for payment. In embodiments, selecting an offer is equated to accepting one or more terms and conditions associated with the offer by adding the products of the provided offer or an item of the second product to the shopping basket and/or by checking-out the products of the provided purchase offer or an item of the second product for payment.

In embodiments, the acquisition of an image identifying a first product and in response to event data representing the event of acquiring the image and/or a subsequent event of adding an item of the first product to the shopping basket in the mobile application program running on the mobile device, the consumer is sent product information and/or a purchase offer from a backend system, where the purchase offers includes a second product different from the first product associated with the acquired image. The user of the mobile device may then accept the offer by adding the products of the provided offer or an item of the second product to the shopping basket and/or by checking-out the products of the provided purchase offer or an item of the second product for payment. In embodiments, selecting an offer is equated to accepting one or more terms and conditions associated with the offer by adding the products of the provided offer or an item of the second product to the shopping basket and/or by checking-out the products of the provided purchase offer or an item of the second product for payment.

Mobile device 105 and the control system 130 may be implemented in any suitable way. FIG. 1 illustrates an exemplary architecture for a mobile device 105 and a control system 130 that may be used in some embodiments. The mobile device 105 may include hardware central processing unit(s) (CPU), operatively connected to hardware/physical memory and input/output (UO) interface. Exemplary server of the control system similarly comprises hardware CPU(s), operatively connected to hardware/physical memory and input/output (UO) interface. Hardware/physical memory may include volatile and/or non-volatile memory. The memory may store one or more instructions to program the CPU to perform any of the functions described herein. The memory may also store one or more application programs.

Exemplary mobile device 105 and exemplary control system 130 may have one or more input and output devices. These devices can be used, among other things, to present a user interface and/or communicate (e.g., via a network) with other devices or computers. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Although examples provided herein may have described the servers as residing on separate computers, it should be appreciated that the functionality of these components can be implemented on a single computer, or on any larger number of computers in a distributed fashion.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only. The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish a relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Variations, modifications, and other implementations of what is described herein will occur to those of ordinary skill in the art without departing from the spirit and the scope of the invention as claimed.

In certain aspects, the technology disclosed relates to a method and system for capturing event data resulting from a consumer's behavior at a retail establishment, the system comprising a mobile device having at least one processor configured to:

obtain, via an image acquisition component of the mobile device an image comprising information that identifies a first product being offered for sale by a retail establishment;

transmit the image to a backend system;

receive, in response, product information comprising description and/or price information for the first product;

identify, by the mobile device, a first event in the retail establishment representing a decision by the consumer to add the first product to the shopping basket of the mobile application program running on the mobile device; and transmit the first event information to the backend system; and receive, by the mobile device and from the backend system, an offer for sale including the first product and at least a second product different from the first product.

In certain aspects, the technology disclosed relates to a method and system for capturing event data resulting from a consumer's behavior at a retail establishment, the system comprising a mobile device having at least one processor configured to:

obtain, via an image acquisition component of the mobile device an image comprising information that identifies a first product being offered for sale by a retail establishment;

transmit the image to a backend system;

receive, in response, product information comprising description and price information for the first product;

identify, by the mobile device, an occurred event representing a decision by the consumer to add the first product to the shopping basket in the mobile application program running on the mobile device; and transmit first event information to the backend system, where the event information is indicating the occurred event of adding the first product to the shopping basket in the mobile application program running on the mobile device;

receive, by the mobile device and from the backend system, an offer for sale including the first product and at least a second product different from the first product;

identify, by the mobile device, at least one of the events of obtaining an image associated with a product item of the second product present in the retail store, adding an item of the second product to the shopping basket in the mobile application program running on the mobile device and adding items according to the offer for sale to the shopping basket in the mobile application program.

In certain aspects, the technology disclosed relates to a method and system for capturing event data resulting from a consumer's behavior at a retail establishment, the system comprising a mobile device having at least one processor configured to:

obtain, via an image acquisition component of the mobile device an image comprising information that identifies a first product being offered for sale by a retail establishment;

transmit the image to a backend system;

receive, in response, product information comprising description and price information for the first product;

identify, by the mobile device, an occurred event representing a decision by the consumer to add the first product to the shopping basket in the mobile application program running on the mobile device; and transmit first event information from the mobile device to the backend system, where the first event information is indicating the occurred event of adding the first product to the shopping basket in the mobile application program running on the mobile device;

receive, by the mobile device and from the backend system, an offer for sale including the first product and at least a second product different from the first product;

identify, by the mobile device, at least one of the events of obtaining an image associated with a product item of the second product present in the retail store, adding an item of the second product to the shopping basket in the mobile application program running on the mobile device and adding items according to the offer for sale to the shopping basket in the mobile application program; and transmit second event information from the mobile device to the backend system, where the second event information is indicating at least one of the events of obtaining an image associated with a product item of the second product present in the retail store, adding an item of the second product to the shopping basket in the mobile application program running on the mobile device and adding items according to the offer for sale to the shopping basket in the mobile application program.

In certain aspects, the technology disclosed relates to a method and system for capturing event data resulting from a consumer's behavior at a retail establishment, the system comprising a mobile device having at least one processor configured to:

obtain, via an image acquisition component of the mobile device an image comprising information that identifies a first product being offered for sale by a retail establishment;

transmit the image to a backend system;

receive, in response, product information comprising description and price information for the first product;

identify, by the mobile device, an occurred event representing a decision by the consumer to add the first product to the shopping basket in the mobile application program running on the mobile device; and transmit first event information from the mobile device to the backend system, where the first event information is indicating the occurred event of adding the first product to the shopping basket in the mobile application program running on the mobile device;

receive, by the mobile device and from the backend system, an offer for sale including the first product and at least a second product different from the first product;

identify, by the mobile device, a second event including at least one of the events of obtaining an image associated with a product item of the second product present in the retail store, adding an item of the second product to the shopping basket in the mobile application program running on the mobile device and adding items according to the offer for sale to the shopping basket in the mobile application program; and displaying, in response to identifying said second event, an optically readable code on the screen of the mobile device, where the optically readable code is indicating to reader that the user of the mobile device is authorized to take advantage of the offer for sale.

In embodiments, the at least one processor is further configured to determine the consumer has decided to accept the offer and allow the consumer to authorize purchase of the product via the mobile device.

In embodiments, the offer for sale has an offer limit based on one or more of an elapsed time since an offer and a maximum number of offers.

In certain aspects, the technology disclosed relates to a method and system for capturing event data resulting from a consumer's behavior at a retail establishment, the system comprising a mobile device having at least one processor configured to:

obtain, via an image acquisition component of the mobile device an image comprising information that identifies a first product being offered for sale by a retail establishment;

transmit the image to a backend system;

receive, in response, product information comprising description and price information for the first product;

identify, by the mobile device, an occurred event representing a decision by the consumer to add the first product to the shopping basket in the mobile application program running on the mobile device; and transmit first event information from the mobile device to the backend system, where the first event information is indicating the occurred event of adding the first product to the shopping basket in the mobile application program running on the mobile device;

receive, by the mobile device and from the backend system, an offer for sale including the first product and at least a second product different from the first product;

identify, by the mobile device, a second event including at least one of the events of obtaining an image associated with a product item of the second product present in the retail store, adding an item of the second product to the shopping basket in the mobile application program running on the mobile device and adding items according to the offer for sale to the shopping basket in the mobile application program; and displaying, in response to identifying said second event, an optically readable code on the screen of the mobile device; and scanning, by a scanner device of the retail store, the optically readable code displayed on the screen of the mobile device, where the optically readable code, when scanned, is indicating to the cashier system of the retail store that the user of the mobile device is authorized to take advantage of the offer for sale.

In certain aspects, the technology disclosed relates to a method and system for capturing event data resulting from a consumer's behavior at a retail establishment, the system comprising a mobile device having at least one processor configured to:

obtain, via an image acquisition component of the mobile device an image comprising information that identifies a first product being offered for sale by a retail establishment;

transmit the image to a backend system;

receive, in response, product information comprising description and price information for the first product;

identify, by the mobile device, an occurred event representing a decision by the consumer to add the first product to the shopping basket in the mobile application program running on the mobile device; and transmit the event information to the backend system, where the event information is indicating the occurred event of adding the first product to the shopping basket in the mobile application program running on the mobile device;

receive, by the mobile device and from the backend system, an offer for sale including the first product and at least a second product different from the first product;

indicating, by the user of the mobile device, the acceptance of the offer for sale, where the acceptance of the offer for sale by the user of the mobile device is determined by the mobile device identifying at least one of the events of obtaining an image associated with a product item of the second product present in the retail store, adding an item of the second product to the shopping basket in the mobile application program running on the mobile device and adding items according to the offer for sale to the shopping basket in the mobile application program.

In certain aspects, the technology disclosed relates to a method and system for capturing event data resulting from a consumer's behavior at a retail establishment, the system comprising a mobile device having at least one processor configured to:

obtain, via an image acquisition component of the mobile device an image comprising information that identifies a first product being offered for sale by a retail establishment, wherein the image comprises one or more of a bar code, an image of the product, an image of all or a portion of packaging of the product, a product name, a brand name, a serial number, and a product number;

transmit the image to a backend system;

receive, in response, product information comprising description and price information for the first product;

identify, by the mobile device, a first event in the retail establishment representing a decision by the consumer to add the first product to the shopping basket of the mobile application program running on the mobile device; and transmit the first event information to the backend system; and receive, by the mobile device and from the backend system, an offer for sale including the first product and at least a second product different from the first product.

In certain embodiments, the at least second product may be added to the shopping basket in the mobile application program by scanning, in the retail store using the mobile device, a barcode associated with a second product item present in the retail store.

According to certain aspects, the technology disclosed relates to a method of obtaining different kinds of event data resulting from different kinds of events performed by a user of a mobile device at a retail store, the method comprising:

scanning, by a scanner operatively connected to a mobile device, a barcode associated with a first product item being offered for sale by the retail store, wherein said first product item belongs to a first product category;

generating, by a mobile application program running on the first mobile device and in response to said scanning, first event data representing said event of scanning said barcode associated with the first product item;

transmitting said generated first event data from the mobile device to a remotely located control system which is at least one of operatively connected and communicatively coupled to a database;

receiving at the mobile device, in response, data representing product information comprising description and price information for said first product item;

displaying the product information in the application program running on the mobile device;

adding the first product item to the electronic shopping cart of said mobile application program running on the mobile device;

generating, by said mobile application program and in response to said event of adding said first product item to the electronic shopping cart, second event data different from said first event data, said second event data representing said event of adding said first product item to said electronic shopping cart;

transmitting said second event data from the mobile device to the remotely located control system;

receiving said second event data at the remotely located control system;

transmitting, from said remotely located control system and in response to receiving said second event data, control data for controlling the display of product information comprising description and a discounted price for product items belonging to a second product category different from said first product category;

displaying, in the application program running on the mobile device and in response to receiving said control data from the remotely located control system, product information comprising description and a discounted price for product items belonging to a second product category different from said first product category, wherein said control data is at least partly based on stored data related to said first and second product category and which is gathered, analyzed and compiled from first and second event data previously received from a plurality of other mobile devices.

In aspects, the technology disclosed relate to a mobile device and method for displaying an optically readable code in the mobile application running on the mobile device in response to the identifying by the mobile device of the occurrence of at least one second event at least one of the events of adding a second product to the electronic shopping basket of the mobile application program, adding an offer for sale including a first and second product to the electronic shopping basket and conducting a check-out of for payment of items of both the first and the second product.

In aspects, the technology disclosed relates to a mobile device and method of generating, by the application program running on the mobile device, an optically readable code, wherein the optically readable code is adapted to be scanned by the barcode reader at the retail store; and displaying, on the screen of the mobile device, the generated optically readable code, wherein the scanning of the optically readable code is an indication to the staff at the retail store that the user of the mobile device is authorized to take advantage of an offer for sale, where the offer for sale may comprise a discounted price for a second product or product category following the reading of said unique optically readable code by the barcode reader of a cashier's machine in the retail store.

In aspects, the technology disclosed relates to a system and a method including the step of generating and/or presenting, by the mobile device and in response to the mobile device identifying the occurrence of the second event, an optically readable code in the mobile application program running on the mobile device to thereby display the optically readable code on the screen of the mobile device, where the optically readable code, e.g. a QR code, is adapted to be scanned by a scanner in the retail store the user of the mobile device is currently present in and the second event is an indication of the occurrence of at least one of the events of adding a second product to the electronic shopping basket of the mobile application program, adding an offer for sale including a first and second product to the electronic shopping basket and conducting a check-out of for payment of items of both the first and the second product.

In aspects, the technology disclosed relates to a method including the step of transmitting, from the remotely located control system and in response to receiving said second event data, a control signal adapted for controlling the display of a unique optically readable code on the mobile device.

The invention claimed is:

1. A method for providing a user of a mobile device with a purchase offer including at least one product available to customers in a store and while the user is present in the store, said method comprising:

a. acquiring or scanning, by an image acquisition component or scanner operatively connected to the mobile device, an image or barcode associated with a physical product item being offered for sale by the store, wherein said physical product item belongs to a first product or first product category;

b. transmitting, by said mobile device, said image or barcode, or data representing said image or barcode, to a control system which is comprising, or is at least one of operatively coupled to and communicatively connected to, a database;

c. transmitting, from the control system to the mobile device, data representing a purchase offer, wherein said purchase offer includes both the first product or first product category and a second product or second product category;

d. displaying, in a browser or an application program running on the mobile device and on a screen of said mobile device, data representing said purchase offer, wherein said step of displaying is performed in response to said mobile device receiving said data representing said purchase offer; and e. identifying, by the application program running on the mobile device, at least one event indicating an acceptance, by the user of the mobile device, of said purchase offer;

f. transmitting, from said mobile device to said control system, event data representing said at least one event indicating the acceptance of said purchase offer;

g. receiving, by the control system, said event data representing said at least one event indicating the acceptance of said purchase offer;

h. transmitting, from the control system to the mobile device, data used for generating and/or displaying an optically readable code generated as a result of the acceptance of the purchase offer, representing said purchase offer, the optically readable code reflects items currently in a shopping basket which includes product items of said purchase offer, wherein a transmission of said data is performed in response to and triggered by said control system receiving said event data indicating the acceptance of said purchase offer;

i. displaying, by the application program running on said mobile device, the optically readable code representing said purchase offer or reflecting the items currently in the shopping basket which includes the product items of said purchase offer;

j. scanning or reading, by an image acquisition, a recognition device or a scanner operatively coupled to at least one of the control system and a cashier system of the store, said optically readable code representing said purchase offer; and k. automatically initiating a payment transaction including the purchase of a product item of said purchase offer in response to the scanning or reading of said displayed optically readable code representing said purchase offer.

2. The method of claim 1, further comprising the step of:

a. generating, by the application program running on said mobile device, an optically readable code representing said purchase offer or reflecting the items currently in the shopping basket which includes the product items of said purchase offer.

3. The method of claim 1, further comprising the steps of:

a. transmitting, from said mobile device to a control system event data representing said at least one event indicating the acceptance of said purchase offer;

b. receiving, by the control system, said event data representing said at least one event indicating the acceptance of said purchase offer; and c. transmitting, from the control system to the mobile device, data used for generating and/or displaying an optically readable code representing said purchase offer or an optically readable code reflecting the items currently in the shopping basket which includes the product items of said purchase offer, wherein said transmission of said data is performed in response to and triggered by said control system receiving said event data indicating the acceptance of said purchase offer.

4. The method according to claim 1, further comprising:

a. acquiring or recognizing, by an image acquisition or recognition device operatively coupled to or communicatively connected to at least one of the control system and the cashier system of the store, said optically readable code, thereby validating or verifying that the user of the mobile device is authorized to take advantage of said purchase offer and may proceed to payment.

5. The method according to claim 1, further comprising:

a. scanning, by a scanner operatively coupled to at least one of the control system and the cashier system of the store, said optically readable code, thereby validating or verifying that the user of the mobile device is authorized to take advantage of said purchase offer and may proceed to payment.

6. The method according to claim 1, further comprising:

a. conducting a payment transaction including the purchase of product item of said purchase offer, wherein said payment transaction is conducted following or in response to said scanning of, or acquiring of an image of, said optically readable code, is validating or verifying that the user of the mobile device is authorized to take advantage of said purchase offer.

7. The method according to claim 1, further comprising the following steps prior to transmitting said data representing said purchase offer:

a. transmitting, from said control system to said mobile device, product and/or price information for said first product or first product category, wherein said product and/or price information for said first product is transmitted in response to receiving said image or barcode or data representing said image or barcode;

b. displaying said product and/or price information for said first product or first product category in the application;

c. identifying, by the application program running on the mobile device, an event associated with said first product or first product category, wherein said event comprises identifying at least one of the events of adding at least one item of the first product or first product category to the shopping basket of the application program and checking out at least one item of the first product or first product category for payment; and d. transmitting, from the mobile device and in response to identifying said event associated with said first product or first product category, event data representing said event associated with said first product or first product category, wherein said step of transmitting data representing a purchase offer is performed in response to said control system receiving said event associated with said first product or first product category.

8. The method according to claim 1, wherein said step of identifying said at least one event indicating the acceptance of said purchase offer comprises identifying, by the application program, at least one of the events of:

a. adding, to the shopping basket of the application program running on the mobile device, at least one item of a second product or second product category different from said first product or first product category;

b. adding, to the shopping basket of the application program running on the mobile device, product items in accordance with said purchase offer;

c. checking out, in the application program, at least one item of said second product or second product category for payment;

d. checking out, in the application program, product items in accordance with said purchase offer;

e. pressing a button, link, area or object in the application program to thereby request verification of an authorized use of said purchase offer; and f. activating an input means of the mobile device to thereby request verification of the authorized use of said purchase offer.

9. The method according to claim 1, further comprising the following step prior to transmitting said data representing said purchase offer:

a. obtaining event data representing identified events associated with at least one of said first and said second product or product category, wherein said events are identified by other mobile devices than said mobile device and the event data transmitted in response to an occurrence of the events is received from other mobile devices than said mobile device, and wherein said events include at least one of the events of acquiring an image of a physical product item, scanning a barcode associated with a physical product item, addition of an item to a shopping basket of the application program, checking out (in the application program) an item for payment and a confirmed purchase of a product item.

10. The method according to claim 1, further comprising the following step prior to transmitting said data representing said purchase offer:

a. obtaining event data representing identified events, wherein said events are identified by and received from said mobile device and indicates a certain shopping behavior of the user of the mobile device, and wherein said events include at least one of the events of acquiring an image of a physical product item, scanning a barcode associated with a physical product item, addition of an item to a shopping basket of the application program, checking out (in the application program) an item for payment and the purchase of a product item.

11. The method according to claim 1, further comprising:

a. constructing said purchase offer at least partly based on said event data.

12. A control system for providing a user of a mobile device with purchase offers including products available to customers in a store and while the user is present in the store, said control system is comprising or is at least one of operatively connected and communicatively coupled to a database comprising one or more stored purchase offers related to a first product and related to one or more second products different from the first product and is configured to:

a. acquire or scan, by an image acquisition component or scanner operatively connected to the mobile device, an image or barcode, or data representing an image or barcode associated with a physical first product item being offered for sale by the store, from a mobile device, wherein said physical product item belongs to a first product or first product category;

b. transmit by said mobile device, said image or barcode, or data representing said image or barcode, to the control system which is comprising, or is at least one of operatively coupled to and communicatively connected to, a database;

c. transmit, from the control system to said mobile device and in response to receiving said image or barcode data, data representing said purchase offer, wherein said purchase offer includes both the first product or first product category and a second product or second product category;

d. display, in a browser or an application program running on the mobile device and on a screen of said mobile device, data representing said purchase offer, wherein said step of displaying is performed in response to said mobile device receiving said data representing said purchase offer;

e. identify, by the application program running on the mobile device, at least one event indicating an acceptance, by the user of the mobile device, of said purchase offer;

f. transmit, from said mobile device to said control system, event data representing said at least one event indicating the acceptance of said purchase offer;

g. receive, by the control system, said event data representing said at least one event indicating the acceptance of the purchase offer; and h. in response to the event data indicating acceptance of the purchase offer, transmit, from the control system to said mobile device, data used for generating and/or displaying an optically readable code generated as a result of the acceptance of the purchase offer, representing said purchase offer, the optically readable code reflects the items currently in a shopping basket which includes the product items of said purchase offer, wherein a transmission of said data is performed in response to and triggered by said control system receiving said event data indicating the acceptance of said purchase offer i. display, by the application program running on said mobile device, an optically readable code representing said purchase offer or reflecting the items currently in the shopping basket which includes the product items of said purchase offer;

j. scan or read, by an image acquisition, a recognition device or a scanner operatively coupled to at least one of the control system and a cashier system of the store, said optically readable code representing said purchase offer; and k. initiate, an automatic payment transaction including the purchase of a product item of said purchase offer in response to the scanning or reading of said displayed optically readable code representing said purchase offer.

13. The control system of claim 12, wherein said control system is further configured to perform said step of transmitting an optically readable code representing said purchase offer, or data used for generating an optically readable code representing said purchase offer, in response to receiving event data indicating that the user of the mobile device has accepted the purchase offer.

14. The control system of claim 12, wherein said control system is further configured to perform said step of transmitting an optically readable code representing said purchase offer, or data used for generating an optically readable code representing said purchase offer, in response to receiving said image or barcode data, wherein said control system is further configured to perform said step of transmitting data representing a purchase offer to the mobile device in response to receiving event data indicating that the user of the mobile device has accepted the purchase offer, and wherein the event data is representing at least one of the events of the user of the mobile device of adding at least one item of the first product or first product category to the shopping basket of the application program and checking out at least one item of the first product or first product category for payment.

15. The control system of claim 12, wherein said control system is further configured to perform the following step prior to transmitting said data representing said purchase offer:

a. transmitting, from said control system to said mobile device, product and/or price information for said first product or first product category, wherein said product and/or price information for said first product is transmitted in response to receiving said image or barcode or data representing said image or barcode.

16. The control system of claim 12, wherein said control system is further configured to perform the following step prior to transmitting said data representing said purchase offer:

a. obtaining event data representing identified events, wherein said events are identified by and received from said mobile device and indicates a certain shopping behavior of the user of the mobile device, and wherein said events include at least one of the events of acquiring an image of a physical product item, scanning a barcode associated with a physical product item, addition of an item to a shopping basket of the application program, checking out (in the application program) an item for payment and the purchase of a product item.

17. The control system of claim 12, wherein said control system is further configured to perform the following step prior to transmitting said data representing said purchase offer:

a. obtaining event data representing identified events, wherein said events are identified by and received from said mobile device and indicates historical shopping behavior of the user of the mobile device, and wherein said events include at least one of events of acquiring an image or scanning a barcode associated with a physical product item, the addition of an item to a shopping basket of the application program, checking out an item for payment and a confirmed payment transaction for the purchase of a product item.

18. The control system of claim 12, wherein said control system is further configured to perform the following step prior to transmitting said data representing said purchase offer:

a. constructing said purchase offer at least partly based on said event data.

19. A mobile device performing an application program installed on the mobile device, said application program is configured to:

a. acquire or scan, by an image acquisition component or scanner operatively connected to the mobile device, an image or barcode associated with a physical product item being offered for sale by a store, wherein said physical product item belongs to a first product or first product category;

b. transmit, by said mobile device, said image or barcode, or data representing said image or barcode, to a control system which is comprising, or is at least one of operatively coupled to and communicatively connected to, a database;

c. transmit, from the control system to the mobile device, data representing a purchase offer, wherein said purchase offer includes both the first product or first product category and a second product or second product category;

d. display, in a browser or the application program running on the mobile device and on an screen of the mobile device, data representing said purchase offer, wherein said step of displaying is performed in response to said mobile device receiving said data representing said purchase offer;

e. identify, by the application program running on the mobile device, and at least one event indicating an acceptance, by a user of the mobile device, of said purchase offer; and f. transmit, from said mobile device to said control system, event data representing said at least one event indicating the acceptance of said purchase offer;

g. receive, by the control system, said event data representing said at least one event indicating the acceptance of said purchase offer;

h. transmit, from the control system to the mobile device, data used for generating and/or displaying an optically readable code generated as a result of the acceptance of the purchase offer, representing said purchase offer, the optically readable code reflects the items currently in a shopping basket which includes the product items of said purchase offer, wherein a transmission of said data is performed in response to and triggered by said control system receiving said event data indicating the acceptance of said purchase offer;

i. display, by the application program running on said mobile device, currently in the shopping basket which includes the product items of said purchase offer;

j. scan or read, by an image acquisition, a recognition device or a scanner operatively coupled to at least one of the control system and a cashier system of the store, said optically readable code representing said purchase offer; and k. automatically initiating a payment transaction by an image acquisition, a recognition device or a scanner operatively coupled to at least one of the control system and the cashier system of the store, said optically readable code representing said purchase offer.

20. The mobile device of claim 19, wherein said application program is configured to identify the at least one event indicating the acceptance of the purchase offer by the user by identifying at least one of the events of:

a. adding, to the shopping basket of the application program running on the mobile device, at least one item of a second product or second product category different from said first product or first product category;

b. adding, to the shopping basket of the application program running on the mobile device, product items in accordance with said purchase offer;

c. checking out, in the application program, at least one item of said second product or second product category for payment;

d. checking out, in the application program, product items in accordance with said purchase offer;

e. pressing a button, link, area or object in the application program to thereby request verification of an authorized use of said purchase offer; and f. activating an input means of the mobile device to thereby request verification of the authorized use of said purchase offer.

\* \* \* \* \*